United States Patent
Xu et al.

(10) Patent No.: US 12,250,735 B2
(45) Date of Patent: Mar. 11, 2025

(54) INACTIVE DIRECT TRANSMISSION FROM USER EQUIPMENT (UE) VIA RANDOM ACCESS CHANNEL (RACH) PROCEDURE

(71) Applicant: Apple Inc., Cupertino, CA (US)

(72) Inventors: Fangli Xu, Beijing (CN); Chunhai Yao, Beijing (CN); Dawei Zhang, Saratoga, CA (US); Haijing Hu, Los Gatos, CA (US); Longda Xing, San Jose, CA (US); Murtaza A. Shikari, Mountain View, CA (US); Sarma V. Vangala, Campbell, NJ (US); Srinivasan Nimmala, San Jose, CA (US); Wei Zeng, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/441,507

(22) PCT Filed: Aug. 6, 2020

(86) PCT No.: PCT/CN2020/107452
§ 371 (c)(1),
(2) Date: Sep. 21, 2021

(87) PCT Pub. No.: WO2022/027455
PCT Pub. Date: Feb. 10, 2022

(65) Prior Publication Data
US 2023/0156823 A1 May 18, 2023

(51) Int. Cl.
*H04W 74/08* (2024.01)
*H04W 74/0833* (2024.01)
*H04W 76/27* (2018.01)

(52) U.S. Cl.
CPC ......... *H04W 74/085* (2013.01); *H04W 76/27* (2018.02)

(58) Field of Classification Search
None
See application file for complete search history.

(56) References Cited

U.S. PATENT DOCUMENTS

| | | | |
|---|---|---|---|
| 2019/0253949 A1 | 8/2019 | Park et al. | |
| 2020/0037345 A1* | 1/2020 | Ryoo | H04W 76/27 |

(Continued)

FOREIGN PATENT DOCUMENTS

| | | |
|---|---|---|
| CN | 103260252 | 8/2013 |
| CN | 110140409 A | 8/2019 |

(Continued)

OTHER PUBLICATIONS

Office Action received for Japanese Patent Application No. 2023-507959, mailed Nov. 27, 2023, 5 pages including 1 pages English translation.

(Continued)

*Primary Examiner* — Scott M Sciacca
(74) *Attorney, Agent, or Firm* — Eschweiler & Potashnik LLC; Ningjiao Zhang

(57) ABSTRACT

Techniques discussed herein can facilitate inactive state transmissions for a User Equipment (UE) via a 4-step or 2-step inactive state RACH process. One example aspect is a UE device, comprising: communication circuitry; and a processor configured to perform operations comprising: in response to a determination to perform a Radio Resource Control (RRC) inactive data transmission: transmitting, via the communication circuitry, a message 1 (Msg1) or a message A (MsgA) preamble based on a Random Access Channel (RACH) configuration for the RRC inactive data transmission; transmitting, via the communication circuitry a message 3 (Msg3) or a MsgA Physical Uplink Shared Channel (PUSCH) comprising uplink (UL) data via configured resources; and receiving, via the communication cir- (Continued)

cuitry, a message 4 (Msg4) or a message B (MsgB) in response to the Msg3 or the MsgA PUSCH.

20 Claims, 16 Drawing Sheets

(56) References Cited

U.S. PATENT DOCUMENTS

| | | | |
|---|---|---|---|
| 2020/0100297 A1 | 3/2020 | Agiwal et al. | |
| 2020/0229111 A1* | 7/2020 | Kim | H04W 76/27 |
| 2022/0141884 A1* | 5/2022 | Lee | H04W 72/23 |
| | | | 370/329 |
| 2023/0013851 A1* | 1/2023 | Lin | H04W 74/08 |
| 2023/0072679 A1* | 3/2023 | Lauridsen | H04B 7/18541 |
| 2023/0284279 A1* | 9/2023 | Zhou | H04W 72/04 |
| | | | 370/328 |
| 2023/0300889 A1* | 9/2023 | Zheng | H04W 76/20 |
| | | | 370/329 |

FOREIGN PATENT DOCUMENTS

| | | |
|---|---|---|
| CN | 110291812 | 9/2019 |
| CN | 110771235 A | 2/2020 |
| CN | 110933766 A | 3/2020 |
| CN | 111447644 A | 7/2020 |
| CN | 111491399 A | 8/2020 |
| EP | 3506708 A1 | 7/2019 |
| WO | 2016105570 A1 | 6/2016 |
| WO | 2018127502 A1 | 7/2018 |
| WO | 2019099550 A1 | 5/2019 |
| WO | 2020092337 A1 | 5/2020 |
| WO | 2020149660 A1 | 7/2020 |

OTHER PUBLICATIONS

Potevio, Discussion on resource configuration for UL URLLC, 3GPP TSG RAN WG1 NR Ad Hoc Meeting R1-1700454, Internet<URL:http://www.3gpp.org/ftp/tsg_ran/WG1_RL1/TSGR1_AH/NR_AH_1701/Docs/R1-1700454.zip>; Jan. 9, 2017.
ZTE Corporation, Sanechips, Configuration aspects for 2-step RACH, 3GPP TSG RAN WG2 Meeting #107bis R2-1913369, Internet<URL:https://www.3gpp.org/ftp/tsg_ran/WG2_RL2/TSGR2_107bis/Docs/R2-1913369.zip>; Oct. 3, 2019.
PCT Search Report dated Apr. 26, 2021 in connection with PCT Application No. PCT/CN2020/107452.
PCT Written Opinion dated Apr. 26, 2021 in connection with PCT Application No. PCT/CN2020/107452.
Huawei et al; "Summary of email discussion [NR-AH1#13][NR] UL data in INACTIVE" 3GPP TSG-RAN WG2 #97; R2-1701125; Feb. 17, 2017.
Interdigital Communications; UL and DL Data Transmission Procedures in Inactive State; 3GPP TSG-RAN WG2 NR AdHoc; R2-1700235; Jan. 19, 2017.
ZTE Corporation; "Work Item on NR smalldata transmissions in INACTIVE state"; 3GPP TSG RAN Meeting #86; RP-193252; Dec. 9, 2019.
International Search Report Dated Apr. 29, 2021 for International Application PCT/CN2020/107380.
International Written Opinion Dated Apr. 29, 2021 for International Application PCT/CN2020/107380.
OPPO; "MsgB Contents and Formats in 2-Step RACH"; 3GPP TSG-RAN WG2; Meeting #106; R2-1905600; May 17, 2019.
ZTE; "Discussion on RRM Requirements for 2-Step Rach"; 3GPP TSG-RAN WG4; Meeting #94-e; R4-2001279; Mar. 6, 2020.
U.S. Appl. No. 17/441,528, filed Sep. 21, 2021.
Huawei; "MSG3 verifivation in target gNB"; 3GPP TSG-RAN WG2 101-bis; R2-1805315; Apr. 16, 2018.
EP Extended Search Report for European Application No. 20948698.4, mailed Jul. 30, 2024.
OPPO; Issues on Data transmission in INACTIVE State; Discussion and Decision; 10.2.2.2; 3GPP TSG-RAN2#97; R2-1700963; Athens, Greece, Feb. 13-17, 2017.
Ericsson; [99bis#53][MTC/NB-IoT] EDT indication via PRACH; Discussion, Decision; 9.14.2; 3GPP TSG-RAN WG2 #100; R2-1713057; Reno, Nevada, USA, Nov. 27-Dec. 1, 2017.
CATT; UL small data transmission in inactive state; 9.2.2.1; Discussion and Decision; 3GPP TSG-RAN WG2 Meeting #96; R2-167954; Reno, USA, Nov. 14-18, 2016.
Samsung; 2 Step RA: MsgA Aspects; Discussion & Decision; 11.13.5; 3GPP TSG-RAN2 106; R2-1905719; Reno, USA, May 13-May 17, 2019.
Chinese Office Action dated Jan. 8, 2025 in connection with Application No. 202080104307.X.

* cited by examiner

INACTIVE DIRECT TRANSMISSION FROM USER EQUIPMENT (UE) VIA RANDOM ACCESS CHANNEL (RACH) PROCEDURE

REFERENCE TO RELATED APPLICATIONS

This application is a National Phase entry application of International Patent Application No. PCT/CN2020/107452 filed Aug. 6, 2020, entitled "INACTIVE DIRECT TRANSMISSION FROM USER EQUIPMENT (UE) VIA RANDOM ACCESS CHANNEL (RACH) PROCEDURE", the contents of which are herein incorporated by reference in their entirety.

BACKGROUND

Mobile communication in the next generation wireless communication system, 5G, or new radio (NR) network will provide ubiquitous connectivity and access to information, as well as ability to share data, around the globe. 5G networks and network slicing will be a unified, service-based framework that will target to meet versatile and sometimes, conflicting performance criteria and provide services to vastly heterogeneous application domains ranging from Enhanced Mobile Broadband (eMBB) to massive Machine-Type Communications (mMTC), Ultra-Reliable Low-Latency Communications (URLLC), and other communications. In general, NR will evolve based on third generation partnership project (3GPP) long term evolution (LTE)-Advanced technology with additional enhanced radio access technologies (RATs) to enable seamless and faster wireless connectivity solutions.

DETAILED DESCRIPTION

Figure 1:
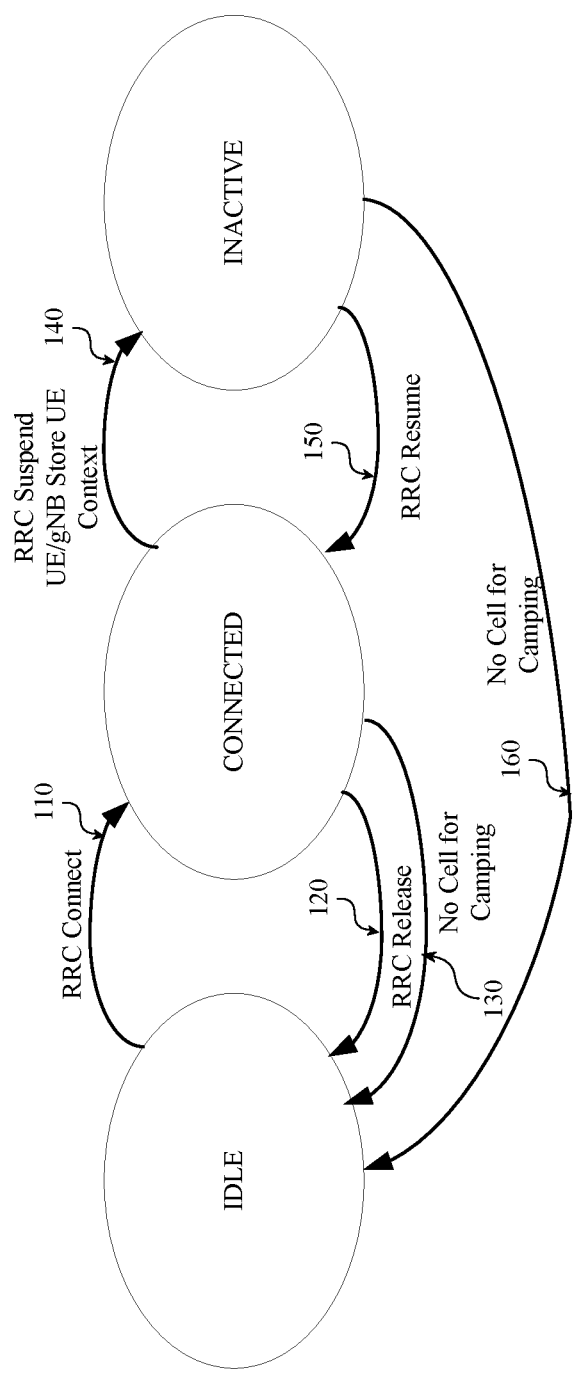
FIG. 1 is a state diagram illustrating the three radio resource control (RRC) states in which a device such as a user equipment (UE) may operate.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone or other device configured to communicate via a 3GPP RAN, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more," unless the context indicates otherwise (e.g., "the empty set," "a set of two or more Xs," etc.).

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items can be distinct or they can be the same, although in some situations the context may indicate that they are distinct or that they are the same.

As used herein, the term "circuitry" can refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some aspects, the circuitry can be implemented in, or functions associated with the circuitry can be implemented by, one or more software or firmware modules. In some aspects, circuitry can include logic, at least partially operable in hardware.

Various aspects discussed herein can relate to facilitating wireless communication, and the nature of these communications can vary.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

An important aspect of wireless devices is the ability to enter a low-power state when the device is not engaging in data transmission or reception. By entering a low-power state the device is able to achieve a balance of acceptable communication performance, acceptable battery consumption, and resource management. As such, devices evolved to initially support idle and connected transition states to presently include suspend and inactive transition states which improved latency and optimized battery consumption.

The main purpose of the inactive state is for a device to return to a connected state as efficiently and quickly as possible and establish data communications. To facilitate efficient transition between connected and inactive states, information is passed between the device and the network as stored information before the device enters an inactive state such as identifiers and security information. The stored information is then used to facilitate efficient transition from the inactive to connected state.

While the inactive state improves latency and optimizes battery consumption, there is still a reduction in latency and cost to battery consumption in existing systems when a user equipment (UE) communicates uplink (UL) or downlink (DL) data with the network. For a UE to perform any dedicated transmission or reception according to existing techniques, resources, time, and battery consumption are spent transitioning states. As such, to enable further optimized devices and networks, there is a need for data transmissions while a device is in an inactive state.

Various aspects of the present disclosure are directed towards new radio (NR) devices enabling data transmission and reception while the device is in an idle state without transition to a connected state. One way to establish data communication while in an idle state is through the use of a random access channel (RACH) procedure configured for an inactive direct data transmission with a large data packet size. In doing so, data up to a size associated with an inactive data limit can be transmitted in the inactive state. Various aspects can facilitate inactive state data transmission according to one or more advantageous features discussed in the present disclosure. Features discussed herein in connection with inactive direct data transmission can enable one or more of: large packet sizes, efficient transmission of data, differentiation of RACH configurations for device states, differentiation of RACHs for inactive devices, support for feedback of inactive devices, and fallback to a resume procedure when appropriate.

FIG. 1 is a state diagram illustrating the three radio resource control (RRC) states in which a device such as a (UE) may operate. In the IDLE state, the UE is disconnected from the core network (CN). While in IDLE the UE performs cell re-selection and can receive paging messages from the CN by way of the cell on which the UE is camping. To enter the CONNECTED state, the UE performs an RRC Connect process 110 in which the UE uses the RACH process (described in more detail below) to connect to the CN and radio access network (RAN). In the CONNECTED state, the UE is connected to and registered with the CN. Control and User plane connections are established between the RAN and the CN for the UE. The RAN is aware of which cell the UE belongs to and all parameters necessary for unicast communication between the UE and RAN are known to both the UE and the RAN. A UE context that includes an access stratum (AS) context of the UE (e.g., the UE's cell radio network temporary identifier (C-RNTI), and Cell Identity of the Primary Cell) and an RRC configuration for the UE (e.g., radio bearer and security information) are stored in the RAN and also in the UE.

From the CONNECTED state, the UE may move back to the IDLE state by performing an RRC Release process 120. When the UE returns to the IDLE state, the UE context is deleted from the UE and the RAN. The UE may also enter the IDLE state by default from either the CONNECTED state or the INACTIVE state when a cell for camping cannot be found as indicated by 130, 160.

The INACTIVE state was introduced in 5G to provide an intermediate state between the IDLE and CONNECTED states that would expedite the re-connection process by eliminating some of the signaling used to transition from the IDLE state to the CONNECTED state. The INACTIVE state is beneficial for UEs that infrequently communicate with the RAN and allows for power saving as compared to these UEs remaining in the CONNECTED state. To enter the INACTIVE state, the UE performs an RRC Suspend process 140 in which the UE context is stored by both the UE and the serving base station (BS) and then the RRC Release process occurs. The BS may be any kind of BS, for example, a Next Generation Node B (gNB) or NR Node B (gNB). In the INACTIVE state, the UE still has a non-access stratum (NAS) connection with the CN (i.e., is still in a connection management (CM)-CONNECTED state as opposed to the IDLE state in which the UE is not CM-CONNECTED).

While in the INACTIVE state, the UE may move within a RAN notification area (RNA) without notifying the RAN, perform cell re-selection, and receive paging messages from the RAN. However, the UE does not have dedicated AS resources for performing unicast communication and thus cannot perform any dedicated data transmission or reception. Since the UE cannot perform dedicated data reception while in INACTIVE state, when downlink data is to be transmitted to the UE, the RAN pages the UE to trigger the UE to enter the CONNECTED state. When the UE has uplink data to be transmitted, the UE enters the CONNECTED state first before transmitting the uplink data.

To enter the CONNECTED state from the INACTIVE state, the UE performs an RRC Resume process 150 in which the UE context is fetched from the UE's last serving cell and restored to the UE and the (new) serving cell. The RRC Resume process expedites the transition to the CONNECTED state as compared to transitioning from the IDLE state from the CONNECTED state by allowing resumption of the previous connection without having to perform extensive NAS signaling.

Figure 2:
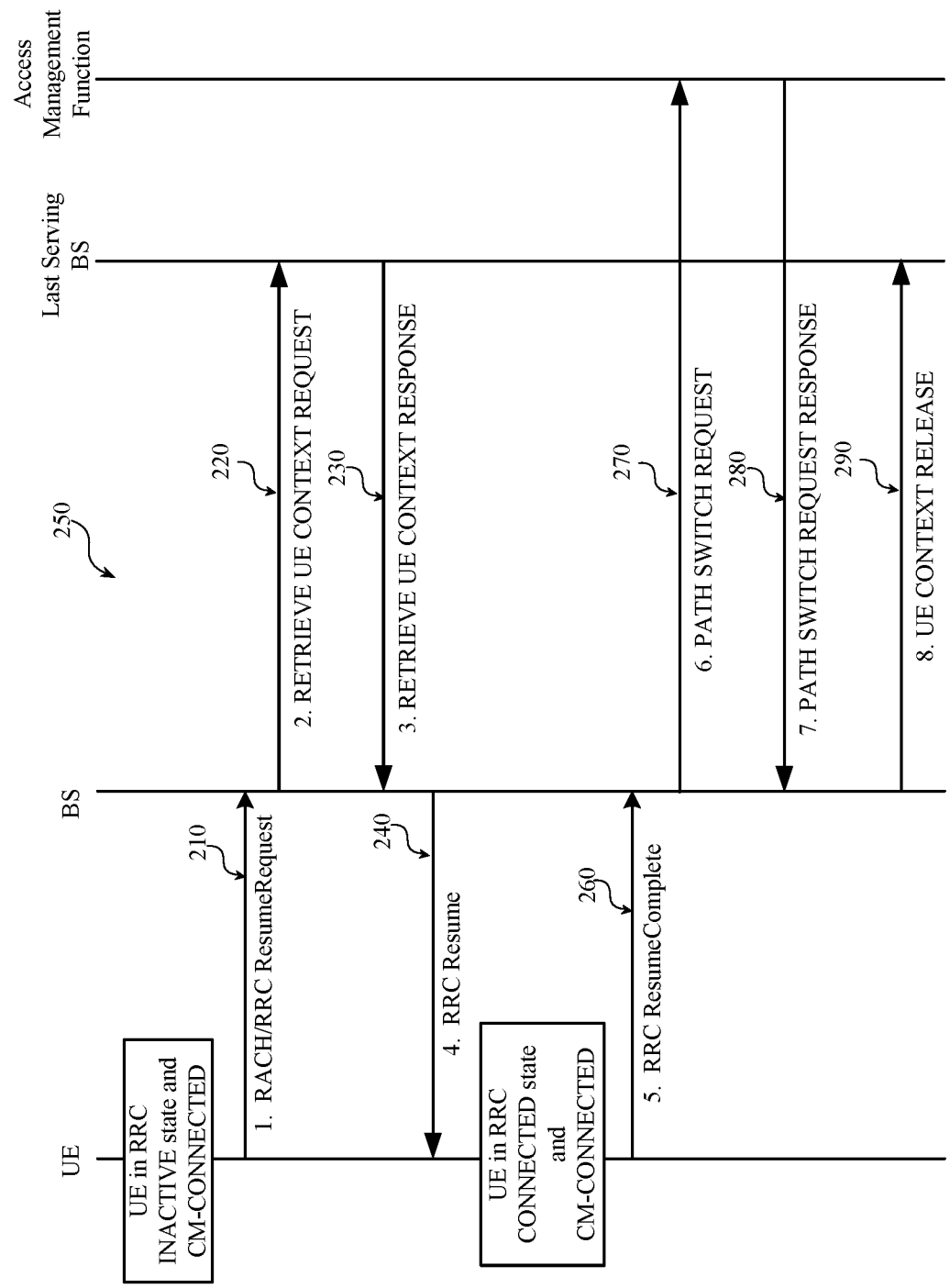
FIG. 2 shows an example radio resource control (RRC) resume process for a UE in an INACTIVE state.

An example RRC resume process 250 is outlined in FIG. 2. The UE is initially in the INACTIVE state. At 210 the UE uses a RACH process to communicate an RRC ResumeRequest to the BS on which it is camping. The RRC ResumeRequest includes an inactive radio network temporary identifier (I-RNTI) for the UE, which is allocated to the UE by the network when the UE enters the inactive state. The network uses the I-RNTI provided with the ResumeRequest to identify the UE and the last serving cell so that the new serving cell may fetch the UE context from the last serving cell.

Figure 3A:
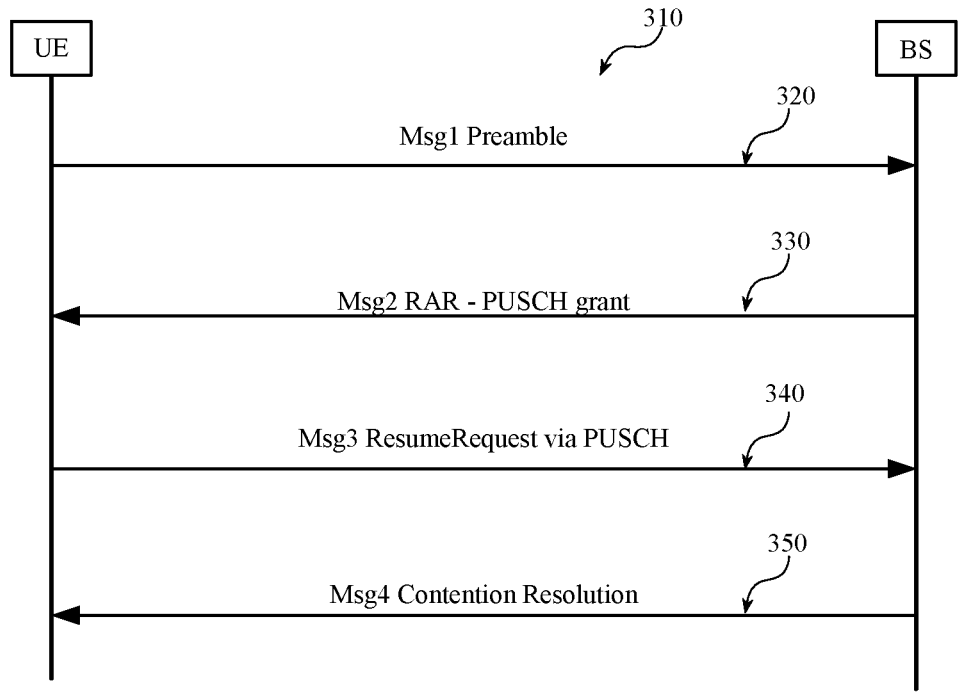
FIG. 3A illustrates a 4-step contention-based random access channel (RACH) (CBRA) process.
Figure 3B:
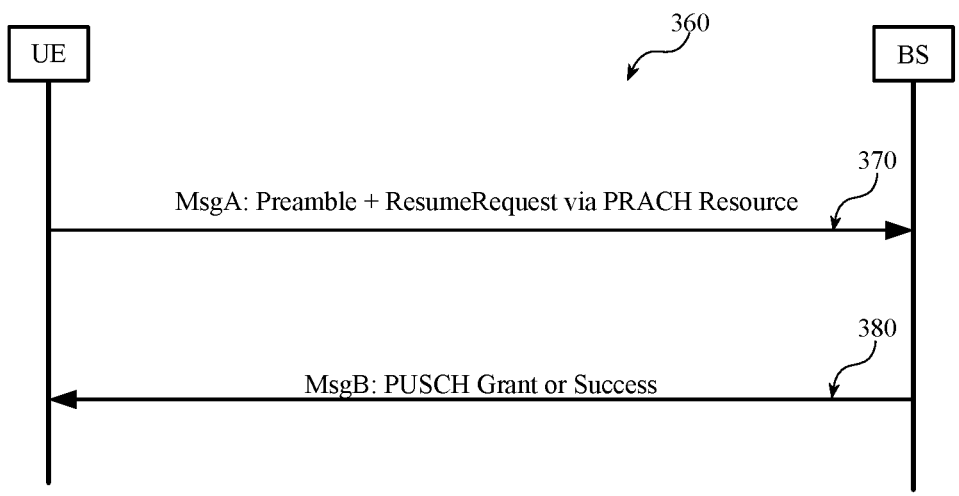
FIG. 3B illustrates a 2-step CBRA process.

Two types of a contention-based RACH (CBRA) process 310 and 360 that may be used to communicate the RRC ResumeRequest are illustrated in more detail in FIGS. 3A and 3B. While the RACH process is described here in the context of communicating a ResumeRequest, the RACH process is used by the UE any time an UE desires to achieve uplink synchronization with the BS to enter the CONNECT state from the IDLE or INACTIVE state or obtain resources for uplink transmission in the CONNECT state.

FIG. 3A illustrates a 4 step contention-based RACH (CBRA) process. At 320, using a predetermined RACH preamble occasion, the UE transmits Msg1 which includes a preamble that identifies the UE. In CBRA the preamble is randomly selected by the UE from a set of possible preambles. In another type of RACH process, contention-free RACH (CFRA), the preamble and optionally also physical uplink shared channel (PUSCH) resources are configured to the UE when the UE enters the INACTIVE or IDLE state. Because it is possible that another UE selects the same preamble via the same preamble RACH resource, CBRA includes a contention resolution step 350 as will be described below. Along with the preamble, the UE also indicates a response window during which the UE expects a response from the BS. If the UE does not receive a response within the window, the UE can re-transmit the preamble and/or take other remedial action.

At 330, the BS transmits Msg2 containing a random access response (RAR) that includes downlink control information (DCI) that can be scrambled based on the preamble transmitted by the UE. The DCI includes information that allows the UE to decode a physical downlink shared channel (PDSCH) that communicates an identifier for the UE as well as an allocation of uplink (UL) resources for use by the UE. At 340, the UE transmits Msg3 using the UL resources received in the RAR. In the instant example, Msg3 will include the ResumeRequest. In other examples, the Msg3 may include other data.

The UE can set up a contention timer upon sending Msg3 and monitors the physical downlink control channel (PDCCH) for Msg4, which is sent by the BS at 350. Msg4 includes a level 2 media access control physical data unit (L2 MAC PDU) that includes a Contention Resolution MAC control element (CE) used by the UE to determine whether the RACH process was successful or not. When the UE does not receive Msg4 before the timer expires it is assumed that the RACH process was not successful. At this point, the UE has successfully notified the gNB of its intention to enter the CONNECT state (e.g., step 210 of FIG. 2 is complete).

FIG. 3B illustrates a 2-step CBRA process 360. At 370, the UE transmits MsgA which includes the information sent in Msg1 and Msg3 of the 4 step RACH process of FIG. 3A. MsgA includes the randomly selected preamble transmitted on physical RACH (PRACH) resources as well as the RRC ResumeRequest which is transmitted using PUSCH resources. At 380 the gNB transmits MsgB which can include a fallback RAR that includes an uplink grant for the UE to re-transmit MsgA when the gNB detects MsgA but cannot decode it. If the gNB successfully decodes MsgA, MsgB includes a success RAR that may include a new UL or downlink (DL) grant for subsequent communication of data (not re-transmission of the RRC ResumeRequest). At this point, the UE has successfully notified the BS of its intention to enter the CONNECT state (e.g., step 210 of FIG. 2 is complete).

Returning to the RRC Resume process outlined in FIG. 2, at 220 after the ResumeRequest has been received by the BS, the BS requests the UE context information that was stored by the last serving BS as part of the RRC Suspend process. At 230, the last serving BS provides the UE context information to the new serving BS. At 240, the BS communicates an RRC Resume message to the UE to indicate that the UE may enter the CONNECTED state. At 260, the UE indicates to the BS that the UE has successfully entered the CONNECTED state. At 270, the BS transmits a Path Switch request that updates the radio bearers for the UE to the Access and Mobility Management Function (AMF), which is the BS interface with the CN. At 280, the AMF responds to the BS confirming the path switch is complete. At 290 the BS informs the last serving BS that it can delete the UE context. After these communications have occurred, the UE may transmit data to and receive data from the BS.

Figure 4A:
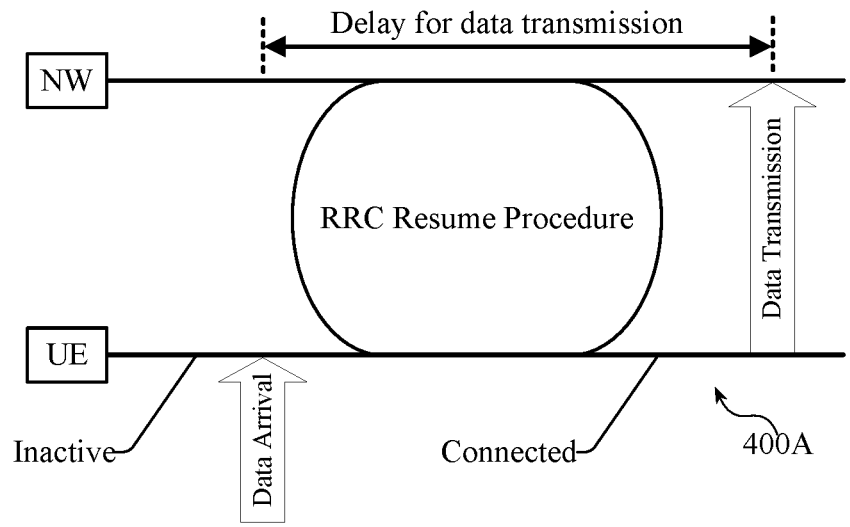
FIG. 4A illustrates the delay in data transmission for a UE that transitions from an INACTIVE state to a CONNECTED state.
Figure 4B:
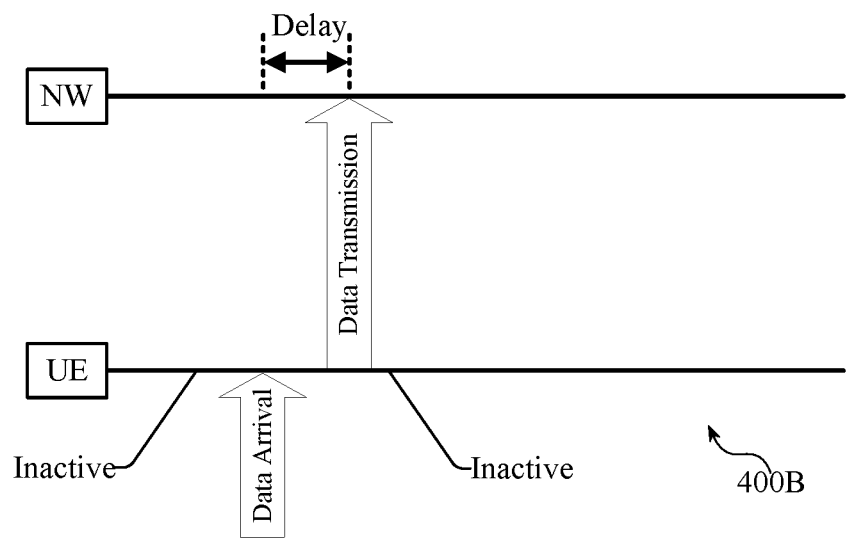
FIG. 4B illustrates the delay in data transmission for a UE that performs direct transmission of data to a base station (BS) while in the INACTIVE state.

Referring to FIG. 4A, it can be seen that the resume process introduces significant delay between when the UE has data to transmit and the UE is able to transmit the data. Disclosed herein are systems, circuitries, and techniques for allowing the UE to perform direct transmission of data to a BS while in the INACTIVE state without transitioning to the CONNECTED state, as illustrated in FIG. 4B.

Figure 5A:
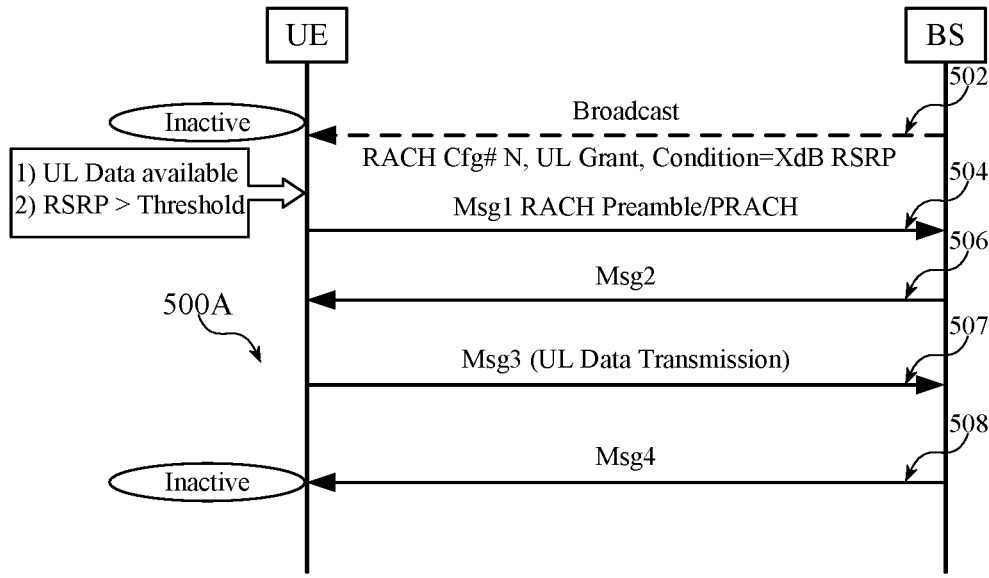
FIG. 5A illustrates a flow diagram of a method for INACTIVE state communication between a BS and a UE with a radio link quality threshold.

FIG. 5A illustrates a flow diagram of a method 500A for INACTIVE state communication between a BS and a UE with a radio link quality threshold. At 502, sometime before the UE may transmit or receive data, the BS can broadcast a message to the UE including various parameters. The parameters may include a RACH configuration (e.g., Cfg #N of a plurality of configured or predefined configurations, etc.), a RACH preamble, a UL grant, and a transmission condition designated for INACTIVE state communication. The RACH preamble may include an identifier for the UE. The UL grant may include a threshold limiting a maximum message size for transmission. The transmission condition may include a radio link quality threshold. The predefined radio link quality threshold may include one or more of a reference signal received power (RSRP) threshold, a reference signal received quality (RSRQ) threshold, or a signal to interference plus noise ratio (SINR) threshold.

After 502, the UE may have data available for communication with the BS and the UE may determine to perform a RRC INACTIVE data transmission. The determination to perform the RRC INACTIVE data transmission can be based on one or more of a determination that the UL data available for communication is less than the UL grant threshold broadcast at 502 or a determination that the radio link quality of the UE is within the predefined radio link quality threshold.

After the above determinations, the UE can proceed to 504 where the UE transmits a Msg1 RACH preamble via a PRACH to the BS, which can include an identifier that identifies the UE. The preamble can be selected from among preambles designated for INACTIVE state communication by the BS in 502. The Msg1 can be transmitted according to the RACH configuration designated for INACTIVE state communication by the BS at 502 (e.g. Cfg #N, etc.).

At 506, the BS can transmits a Msg2 to the UE as a Random Access Response (RAR), which can indicate timing (e.g., via a timing advance command (TAC)) and an UL grant for the UE for the RRC INACTIVE data transmission. At 507, the UE transmits a Msg3 PUSCH to the BS. The Msg3 PUSCH includes the UL data transmission for INACTIVE state communication. At 508, the BS can transmit a Msg4 to the UE during a contention resolution (CR) window, and the UE can determine that the RRC INACTIVE data transmission was successfully completed in response to receiving the Msg4. Method 500A can be performed while the UE remains in an INACTIVE state. Method 500A can provide reduced delay for transmitting data to the BS when compared to the RRC RESUME process described in FIG. 2.

Figure 5B:
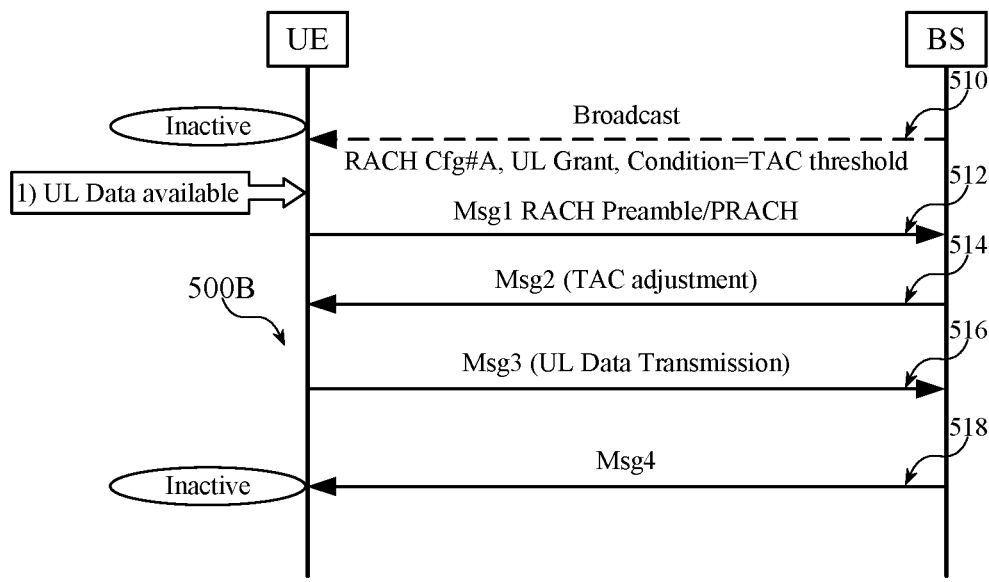
FIG. 5B illustrates a flow diagram of a method for INACTIVE state communication between a BS and a UE with a radio link timing threshold.

FIG. 5B illustrates a flow diagram of a method 500A for INACTIVE state communication between a BS and a UE with a radio link timing threshold. At 510, sometime before the UE may transmit or receive data, the BS can broadcast a message to the UE including various parameters. The parameters may include a RACH configuration (e.g., Cfg #N of a plurality of configured or predefined configurations, etc.), a RACH preamble, a UL grant, and a transmission condition designated for INACTIVE state communication. The RACH preamble may include an identifier for the UE. The UL grant may include a threshold limiting a maximum message size for transmission. The transmission condition may include a radio link timing threshold. The predefined radio link timing threshold may include a TAC threshold.

After 510, the UE may have data available for communication with the BS and the UE may determine to perform a RRC INACTIVE data transmission. The UE can determine that the UL data available for communication is less than the UL grant threshold described in 510.

After the above determinations, the UE can proceed to 512 where the UE can transmit a Msg1 RACH preamble via PRACH to the BS, which can include an identifier that identifies the UE. The preamble can be selected from among preambles designated for INACTIVE state communication by the BS in 510. The Msg1 can be transmitted according to the RACH configuration designated for INACTIVE state communication by the BS at 510 (e.g. Cfg #N, etc.).

In some embodiments, based on the time by which the BS receives the Msg1 at 512, the BS is able to determine a TAC adjustment. At 514, the BS can transmit a Msg2 to the UE as a RAR which can include the TAC adjustment, and UL grant for the UE for the RRC INACTIVE data transmission. The UE receives the Msg2 from the BS and the UE makes a determination to prepare a Msg3 PUSCH by comparing the TAC adjustment with the TAC threshold. After the UE makes a determination to prepare the Msg3 PUSCH, the UE transmits the Msg3 PUSCH including the UL data transmission for INACTIVE state communication. The UE adjusts the timing of the Msg3 based on the TAC adjustment sent by the BS in 514.

In some embodiments, the UE can make a determination to prepare a Msg3 PUSCH by estimating a timing advance (TA) value and comparing the TA value to the TAC threshold. After the UE makes a determination to prepare the Msg3 PUSCH, the UE transmits a Msg3 PUSCH including the UL data transmission for INACTIVE state communication. The UE adjusts the timing of the Msg3 based on the estimated TA value determined by the UE prior to transmitting Msg3.

At 518, the BS can transmit a Msg4 to the UE during a CR window, and the UE can determine that the RRC INACTIVE data transmission was successfully completed in response to receiving the Msg4. Method 500B can be performed while the UE remains in an INACTIVE state. Method 500B can provide reduced delay for transmitting data to the BS when compared to the RRC RESUME process described in FIG. 2.

Figure 6A:
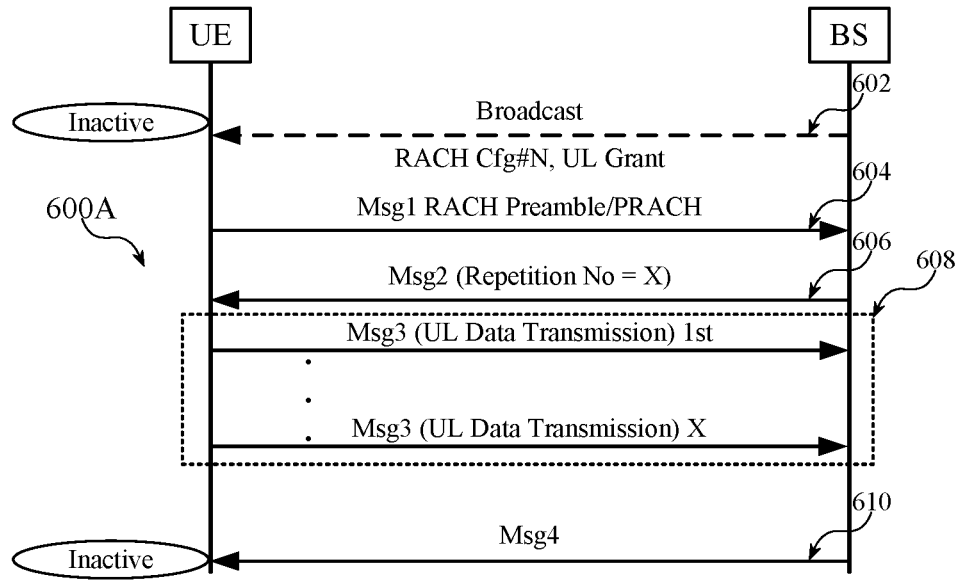
FIG. 6A illustrates a flow diagram of a method for a 4-step RACH INACTIVE state communication between a BS and a UE with a repetition scheme.

FIG. 6A illustrates a flow diagram of a method 600A for a 4-step RACH INACTIVE state communication between a BS and a UE with a repetition scheme. At 602, sometime before the UE may transmit or receive data, the BS can broadcast a message to the UE including various parameters. The parameters may include a RACH configuration (e.g., Cfg #N of a plurality of configured or predefined configurations, etc.), a RACH preamble, and a UL grant designated for INACTIVE state communication. The RACH preamble may include an identifier for the UE. The UL grant may include a threshold limiting a maximum message size for transmission.

At 604, the UE may determine to transmit a Msg1 RACH preamble via PRACH to the BS, which can include an identifier that identifies the UE. The preamble can be selected from among preambles designated for INACTIVE state communication by the BS in 602. The Msg1 can be transmitted according to the RACH configuration designated for INACTIVE state communication by the BS (e.g. Cfg #N, etc.).

At 606, the BS can transmit a Msg2 to the UE as a RAR which can include a Msg3 repetition number, and UL grant for the UE for the RRC INACTIVE data transmission. Alternatively, the Msg3 repetition number can be configured by L1, L2, or L3 signaling or the UE can configure the repetition number based on radio quality. Radio quality can include one or more of RSRQ, RSRP, or SINR. At 608 the UE can prepare a Msg3 PUSCH including a UL data transmission for INACTIVE state communication. A hybrid automatic repeat request (HARQ) may transmit the Msg3 repetitively until the Msg3 is acknowledged by the BS or until the repetition number is reached. Alternatively, a L1 process may transmit the Msg3 repetitively until the repetition number is reached. After the repetition number is reached, the UE can start a (CR) timer associated with a Msg4 CR window. Upon reception of the Msg3, the BS can transmit a Msg4 to the UE at 610 during the Msg4 CR window, and the UE can determine that the RRC INACTIVE data transmission was successfully completed in response to receiving the Msg4. Method 600A can be performed the UE remains in an INACTIVE state. Method 600A can provide reduced delay for transmitting data to the BS when compared to the RRC RESUME process described in FIG. 2.

Figure 6B:
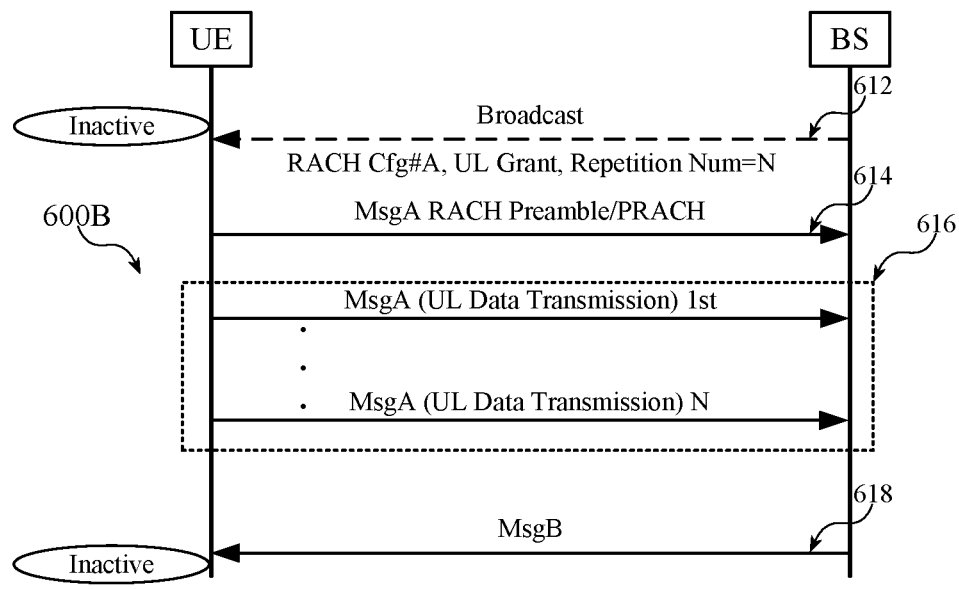
FIG. 6B illustrates a flow diagram of a method for a 2-step RACH INACTIVE state communication between a BS and a UE with a repetition scheme.

FIG. 6B illustrates a flow diagram of a method 600B for a 2-step RACH INACTIVE state communication between a BS and a UE with a repetition scheme. At 612, sometime before the UE may transmit or receive data, the BS can broadcast a message to the UE including various parameters. The parameters may include a RACH configuration (e.g., Cfg #N of a plurality of configured or predefined configurations, etc.), a RACH preamble, a UL grant, and a MsgA repetition number designated for INACTIVE state communication. Alternatively, the MsgA repetition number can be configured by L1, L2, or L3 signaling or the UE can configure the repetition number based on radio quality. Radio quality can include one or more of RSRQ, RSRP, or SINR. The RACH preamble may include an identifier for the UE. The UL grant may include a threshold limiting a maximum message size for transmission.

After 612, the UE may determine to transmit a MsgA at 614 and 616 to the BS. At 614, the UE can transmit a MsgA RACH preamble via PRACH, which can include an identifier that identifies the UE. The preamble can be selected from among preambles designated for INACTIVE state communication by the BS in 612. The MsgA can be transmitted according to the RACH configuration designated for INACTIVE state communication by the BS in 612 (e.g. Cfg #N, etc.).

At 616, the UE can further prepare a MsgA PUSCH including the UL data transmission for INACTIVE state communication. A hybrid automatic repeat request (HARQ) may transmit the MsgA repetitively until the MsgA is acknowledged by the BS or until the repetition number is reached. Alternatively, a L1 process transmits the MsgA repetitively until the repetition number is reached. After the repetition number is reached, a RAR window can be started associated with a MsgB. Upon reception of the MsgA, the BS can transmit the MsgB to the UE at 618 during the RAR window, and the UE can determine that the RRC INACTIVE data transmission was successfully completed in response to receiving the MsgB. Method 600B can be performed the UE remains in an INACTIVE state. Method 600B can provide reduced delay for transmitting data to the BS when compared to the RRC RESUME process described in FIG. 2.

Figure 7A:
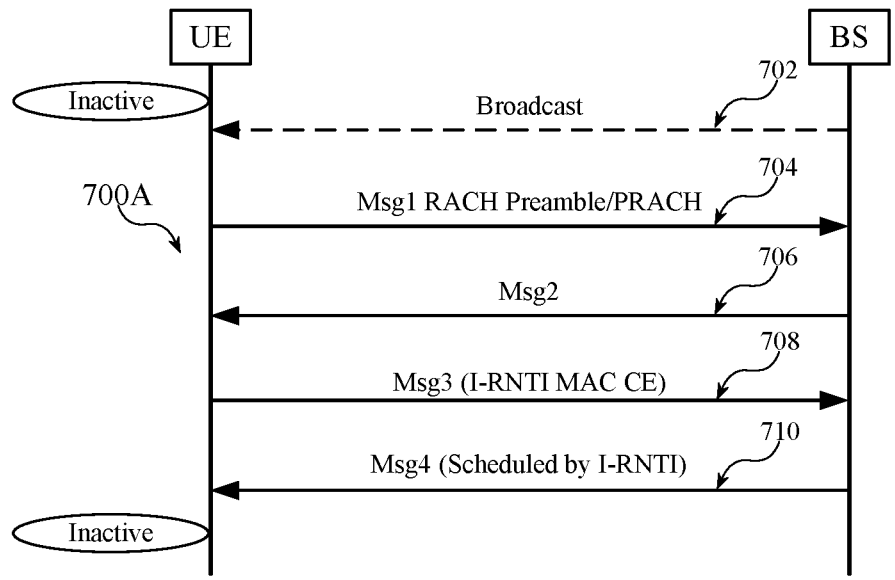
FIG. 7A illustrates a flow diagram of a method for a 4-step RACH INACTIVE state communication between a BS and a UE with differentiation of RACH and UE based on an inactive radio network temporary identifier (I-RNTI) or truncated I-RNTI.

FIG. 7A illustrates a flow diagram of a method 700A for a 4-step RACH INACTIVE state communication between a BS and a UE with differentiation of RACH and UE based on an I-RNTI (e.g., which can be a full I-RNTI of the UE (comprising 24 bits) or a truncated I-RNTI of the UE (comprising 16 bits)). At 702, sometime before the UE may transmit or receive data, the BS can broadcast a message to the UE including various parameters that may include a UL grant designated for INACTIVE state communication. The UL grant may include a threshold limiting a maximum message size for transmission.

At 704, the UE may determine to transmit a Msg1 RACH preamble via PRACH to the BS. At 706, the BS may transmit a Msg2 to the UE as a RAR.

At 708, the UE may transmit a Msg3 PUSCH including a UL data transmission for INACTIVE state communication. The Msg3 can include a medium access control (MAC) control element (CE) where the MAC CE has an I-RNTI/truncated I-RNTI. The MAC CE with the I-RNTI/truncated I-RNTI can be configured for INACTIVE state communication and can identify the UE. After the BS receives Msg3, the BS can read the MAC CE with the I-RNTI/truncated I-RNTI, can distinguish the RACH as an INACTIVE state communication, and can identify the UE based on the MAC CE with the I-RNTI/truncated I-RNTI. At 710, the BS may transmit a Msg4 to the UE during a CR window, and the UE can determine that the RRC INACTIVE data transmission was successfully completed in response to receiving the Msg4. The BS can use the I-RNTI/truncated I-RNTI to schedule the Msg4 transmission or the subsequent data transmissions that may occur in the INACTIVE state.

In an alternative aspect, the UE can use the I-RNTI/truncated I-RNTI to scramble the Msg3 PUSCH transmission at 708. After the BS receives the Msg3, the BS can descramble the Msg3 containing the UL data. The BS can descramble the Msg3 with a set of one or more potential I-RNTI/truncated I-RNTI that comprises the I-RNTI/truncated I-RNTI. At 710, the BS may transmit a Msg4 to the UE during a CR window, and the UE can determine that the RRC INACTIVE data transmission was successfully completed in response to receiving the Msg4. The BS can use the I-RNTI/truncated I-RNTI to schedule the Msg4 transmission or the subsequent data transmissions that may occur in the INACTIVE state. Method 700A can be performed while the UE remains in an INACTIVE state. Method 700A can provide reduced delay for transmitting data to the BS when compared to the RRC RESUME process described in FIG. 2.

Figure 7B:
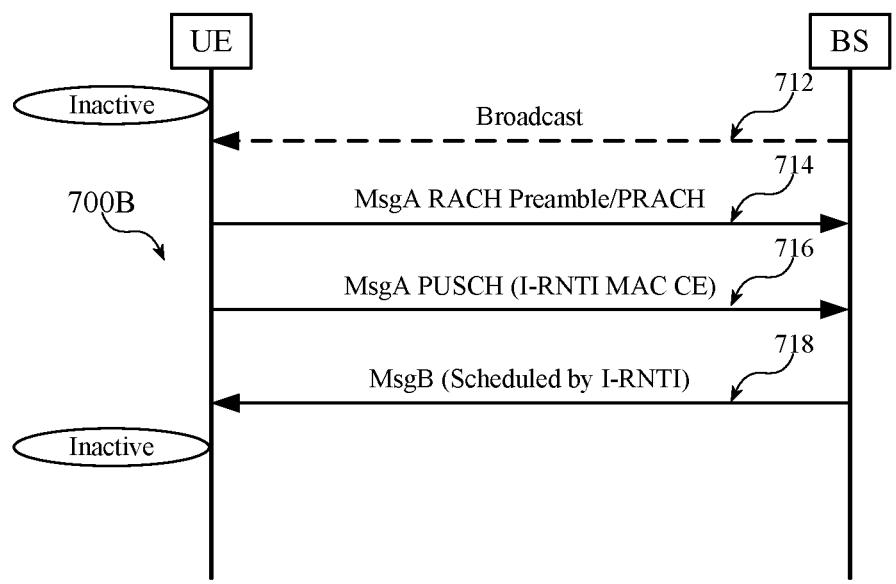
FIG. 7B illustrates a flow diagram of a method for a 2-step RACH INACTIVE state communication between a BS and a UE with differentiation of RACH and UE based on an I-RNTI or truncated I-RNTI.

FIG. 7B illustrates a flow diagram of a method 700A for a 2-step RACH INACTIVE state communication between a BS and a UE with differentiation of RACH and UE based on an I-RNTI (e.g., which can be a full I-RNTI of the UE or a truncated I-RNTI of the UE). The I-RNTI can consist of 24-bits and the truncated I-RNTI can consist of 16-bits. At 712, sometime before the UE may transmit or receive data, the BS can broadcast a message to the UE including various parameters that may include a UL grant designated for INACTIVE state communication. The UL grant may include a threshold limiting a maximum size for transmission.

After 712, the UE may determine to transmit a MsgA at 714 and 616 to the BS. At 714, the UE can transmit a MsgA RACH preamble via PRACH.

At 716, the UE may transmit a MsgA PUSCH including a UL data transmission for INACTIVE state communication. The MsgA can include a MAC CE where the MAC CE has an I-RNTI/truncated I-RNTI. The MAC CE with the I-RNTI/truncated I-RNTI can be configured for INACTIVE state communication and can identify the UE. After the BS receives MsgA, the BS can read the MAC CE with the I-RNTI/truncated I-RNTI and can distinguish the RACH as an INACTIVE state communication and can identify the UE based on the MAC CE with the I-RNTI/truncated I-RNTI. At 718, the BS may transmit a MsgB to the UE, and the UE can determine that the RRC INACTIVE data transmission was successfully completed in response to receiving the MsgB. The BS can use the I-RNTI/truncated I-RNTI to schedule the MsgB transmission or the subsequent data transmissions that may occur in the INACTIVE state.

In an alternative aspect, the UE can use the I-RNTI/truncated I-RNTI to scramble the MsgA PUSCH transmission at 714 and 716. After the BS receives the MsgA, the BS can descramble the MsgA containing the UL data. The BS can descramble the MsgA with a set of one or more potential I-RNTI/truncated I-RNTI that comprises the I-RNTI/truncated I-RNTI. At 718, the BS may transmit a MsgB to the UE, and the UE can determine that the RRC INACTIVE data transmission was successfully completed in response to receiving the MsgB. The BS can use the I-RNTI/truncated I-RNTI to schedule the MsgB transmission or the subsequent data transmissions that may occur in the INACTIVE state. Method 700B can be performed while the UE remains in an INACTIVE state. Method 700B can provide reduced delay for transmitting data to the BS when compared to the RRC RESUME process described in FIG. 2.

Figure 8A:
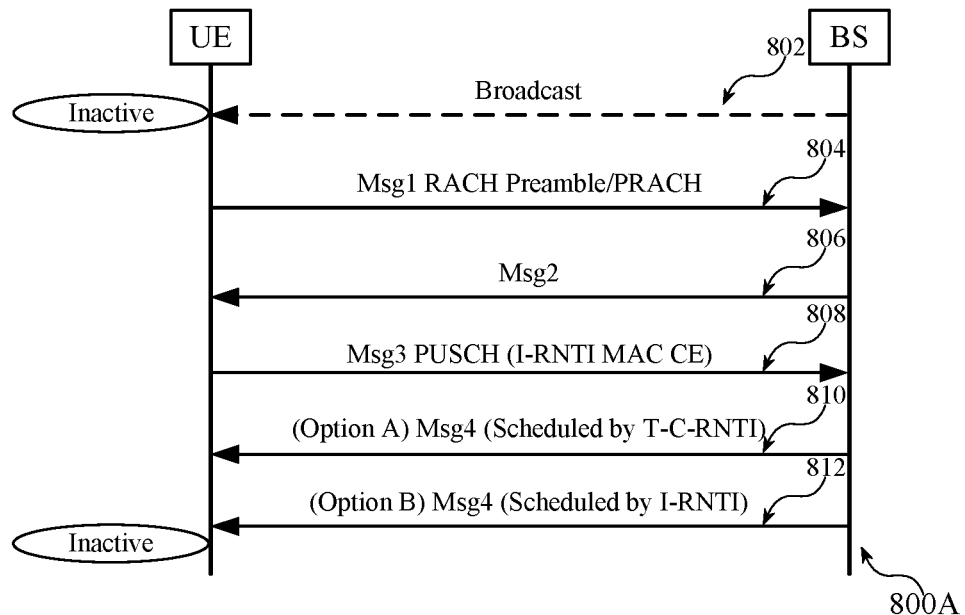
FIG. 8A illustrates a flow diagram of a method for a 4-step RACH INACTIVE state communication between a BS and a UE with feedback for a successful transmission.

FIG. 8A illustrates a flow diagram of a method 800A for a 4-step RACH INACTIVE state communication between a BS and a UE with feedback for a successful transmission. At 802, sometime before the UE may transmit or receive data, the BS can broadcast a message to the UE including various parameters that may include a UL grant designated for INACTIVE state communication. The UL grant may include a threshold limiting a maximum message size for transmission.

At 804, the UE may determine to transmit a Msg1 RACH preamble with a PRACH to the BS. At 806, the BS may transmit a Msg2 to the UE as a RAR.

At 808, the UE may transmit a Msg3 PUSCH including a UL data transmission for INACTIVE state communication. The Msg3 can include a MAC CE where the MAC CE has an I-RNTI/truncated I-RNTI. The MAC CE with the I-RNTI/truncated I-RNTI can be configured for INACTIVE state communication and can identify the UE. Upon transmitting the Msg3, the UE can start a contention resolution timer where the CR timer is set to end at a CR duration limit.

After the BS receives Msg3, the BS can read the MAC CE with the I-RNTI/truncated I-RNTI and can distinguish the RACH as an INACTIVE state communication and can identify the UE based on the MAC CE with the I-RNTI/truncated I-RNTI. In some embodiments, the BS may transmit a Msg4 in response to the Msg3 at 810. The Msg4 of 810 may include a DL assignment scheduled by a temporary cell radio network temporary identifier (T-C-RNTI) and the DL assignment may include the MAC CE. When the UE receives Msg4 within the CR duration limit, the UE can regard the RRC INACTIVE data transmission a success.

In an alternative aspect, the UE can use the I-RNTI/truncated I-RNTI to scramble the Msg3 PUSCH transmission at 808. Upon transmitting the Msg3, the UE can start a contention CR where the CR timer is set to end at a CR duration limit. After the BS receives the Msg3, the BS can descramble the Msg3 containing the MAC CE with the I-RNTI/truncated I-RNTI and the UL data. The BS can descramble the Msg3 with a set of one or more potential I-RNTI/truncated I-RNTI that comprises the I-RNTI/truncated I-RNTI. The BS can read the MAC CE with the I-RNTI/truncated I-RNTI and can distinguish the RACH as an INACTIVE state communication and can identify the UE based on the MAC CE with the I-RNTI/truncated I-RNTI. In some embodiments, instead of transmitting the Msg4 as described in connection with 810, the BS may transmit a Msg4 in response to the Msg3 at 812 that may include a UL grant/DL assignment for new data scrambled by the I-RNTI/truncated I-RNTI. When the UE receives Msg4 within the CR duration limit, the UE can regard the RRC INACTIVE data transmission a success.

Figure 8B:
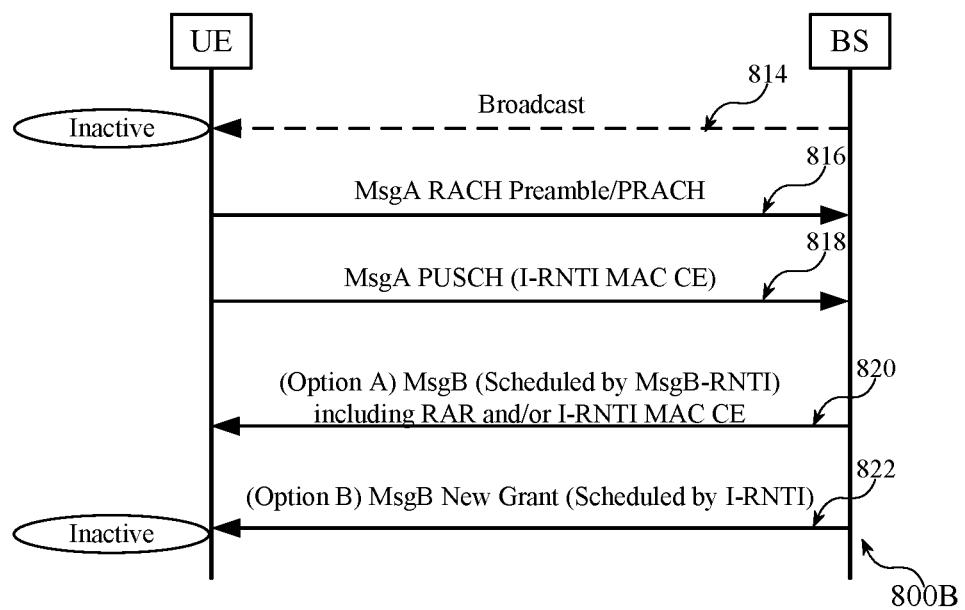
FIG. 8B illustrates a flow diagram of a method for a 2-step RACH INACTIVE state communication between a BS and a UE with feedback for a successful transmission.

FIG. 8B illustrates a flow diagram of a method 800B for a 2-step RACH INACTIVE state communication between a BS and a UE with feedback for a successful transmission. At 814, sometime before the UE may transmit or receive data, the BS can broadcast a message to the UE including various parameters that may include a UL grant designated for INACTIVE state communication. The UL grant may include a threshold limiting a maximum message size for transmission.

After 814, the UE may determine to transmit a MsgA to the BS at 816 and 818. At 816, the UE can transmit a MsgA RACH preamble with a PRACH. At 818, the UE may transmit a MsgA PUSCH including a UL data transmission for INACTIVE state communication. The MsgA can include a MAC CE with an I-RNTI/truncated I-RNTI. The MAC CE with the I-RNTI/truncated I-RNTI can be configured for INACTIVE state communication and can identify the UE. When the UE transmits MsgA, the UE can start a MsgB window.

After the BS receives MsgA, the BS can read the MAC CE with the I-RNTI/truncated I-RNTI and can distinguish the RACH as an INACTIVE state communication and can identify the UE based on the MAC CE with the I-RNTI/truncated I-RNTI. The BS may transmit a MsgB in response to the MsgA at 820 Option A. The MsgA may include a RAR and/or the MAC CE with the I-RNTI/truncated I-RNTI from MsgB. When the UE receives MsgB within the MsgB window, the UE can regard the RRC INACTIVE data transmission a success.

In an alternative aspect, the UE can use the I-RNTI/truncated I-RNTI to scramble the MsgA PUSCH transmission at 818. After the BS receives the MsgA, the BS can descramble the MsgA containing the MAC CE with the I-RNTI/truncated I-RNTI and the UL data. The BS can descramble the Msg3 with a set of one or more potential I-RNTI/truncated I-RNTI that comprises the I-RNTI/truncated I-RNTI. The BS can read the MAC CE with the I-RNTI/truncated I-RNTI and can distinguish the RACH as an INACTIVE state communication and can identify the UE based on the MAC CE with the I-RNTI/truncated I-RNTI. The BS may transmit a MsgB in response to the MsgA at 822 Option B. The MsgB may include a UL grant/DL assignment for new data scrambled by the I-RNTI/truncated I-RNTI. When the UE receives MsgB within the MsgB window, the UE can regard the RRC INACTIVE data transmission a success.

In various embodiments, such as those described in connection with FIG. 5A through FIG. 8B, the RACH can be a dedicated RACH configuration for the RRC INACTIVE data communication. The BS can provide the dedicated RACH configuration to the UE, for example, in the broadcast transmission before the UE performs an INACTIVE state communication. The UE in the INACTIVE state can perform the INACTIVE state communication using the dedicated RACH configuration.

In various embodiments, such as those described in connection with FIG. 5A through FIG. 8B, the RACH preamble can be a dedicated RACH preamble from a dedicated RACH preamble group for RRC INACTIVE data communication. The BS can provide a shared RACH preamble group to the UE, for example, in the broadcast transmission before the UE performs an INACTIVE state communication. The UE in the INACTIVE state may select the dedicated RACH preamble from the dedicated group for the INACTIVE state communication.

In various embodiments, including those described in connection with FIG. 5A through FIG. 8B, the RACH preamble can be a shared RACH preamble for both the RACH procedure of the RRC INACTIVE data communication and a RACH procedure of a RRC resume procedure.

Figure 9A:
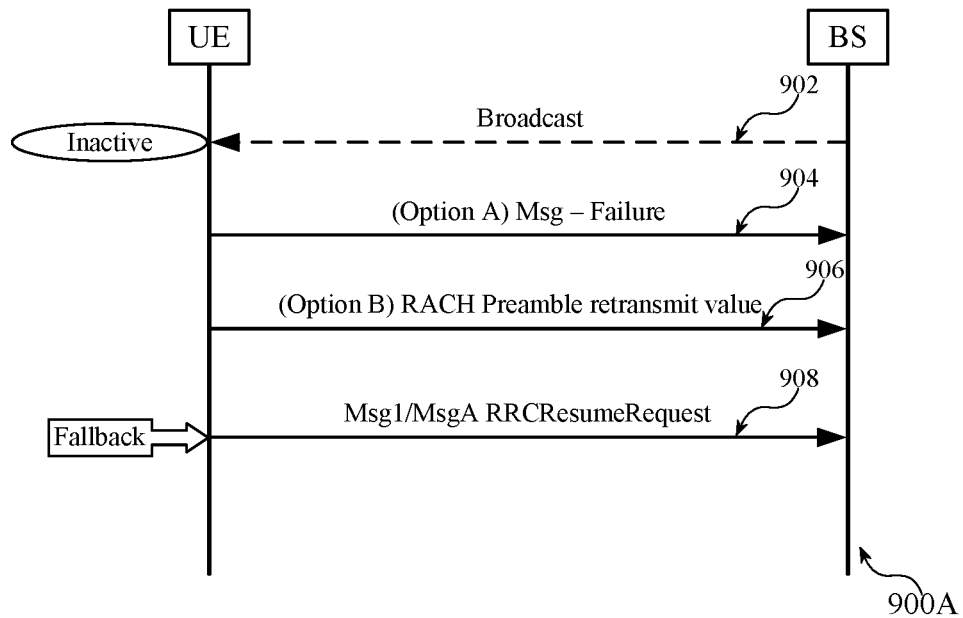
FIG. 9A illustrates a flow diagram of a method for a RACH INACTIVE state communication between a BS and a UE with a fallback mechanism to a RRC Resume process by failing the RACH procedure or reaching a physical RACH (PRACH) retransmission value.

FIG. 9A illustrates a flow diagram of a method 900A for a RACH INACTIVE state communication between a BS and a UE with a fallback mechanism to a RRC Resume process by failing the RACH procedure or reaching a RACH preamble retransmission value. The UE can be configured to suspend the RACH procedure for RRC INACTIVE data transmission according to a suspend criteria. When the suspend criteria is met, the UE can fallback to a RRC resume process by transmitting a RRC ResumeRequest to follow a resume procedure that may include the procedure outlined in FIG. 1 and FIG. 2.

At 902, sometime before the UE may transmit or receive data, the BS can broadcast a message to the UE including various parameters. The parameters may include one or more of a RACH preamble, RACH preamble retransmission number, RACH configuration, UL grant, radio link quality threshold, radio link timing threshold, Msg3 and/or MsgA repetition value.

The UE and BS can engage in INACTIVE state communications through a 4-step or 2-step RACH procedure for the RRC INACTIVE data communication. The suspend criteria may include any failure of the RACH process, such as shown at 904. Sometime before or after a MsgA, or MsgB; or a Msg1, Msg2, Msg3, or Msg4, the RACH process may fail. An example of a failed RACH process would include unsuccessful completion of any step described with regards to FIG. 5A through FIG. 8B. If the RACH process fails, the UE can suspend the RACH procedure and fall back to a Msg1 or MsgA RRC resume process by transmitting a RRC ResumeRequest to the BS as in 908 that can include the RRC resume process described in FIG. 1 and FIG. 2.

In an alternative aspect, the UE may be configured to retransmit the RACH preamble for the RRC INACTIVE data transmission according to a retransmit value, such as shown at 906. The 4-step or 2-step RACH procedure for a RRC INACTIVE data communication may not encounter a failure during the intermediate steps of the RACH procedure, for example, the steps described in FIG. 5A through FIG. 8B. However, the UE may retransmit the RACH preamble and reach the retransmit value. Upon reaching the retransmit value, the UE can suspend the RACH procedure and fallback to the Msg1 or MsgA RRC resume process by transmitting a RRC ResumeRequest to the BS as in 908 that may include the RRC resume process described in FIG. 1 and FIG. 2.

Figure 9B:
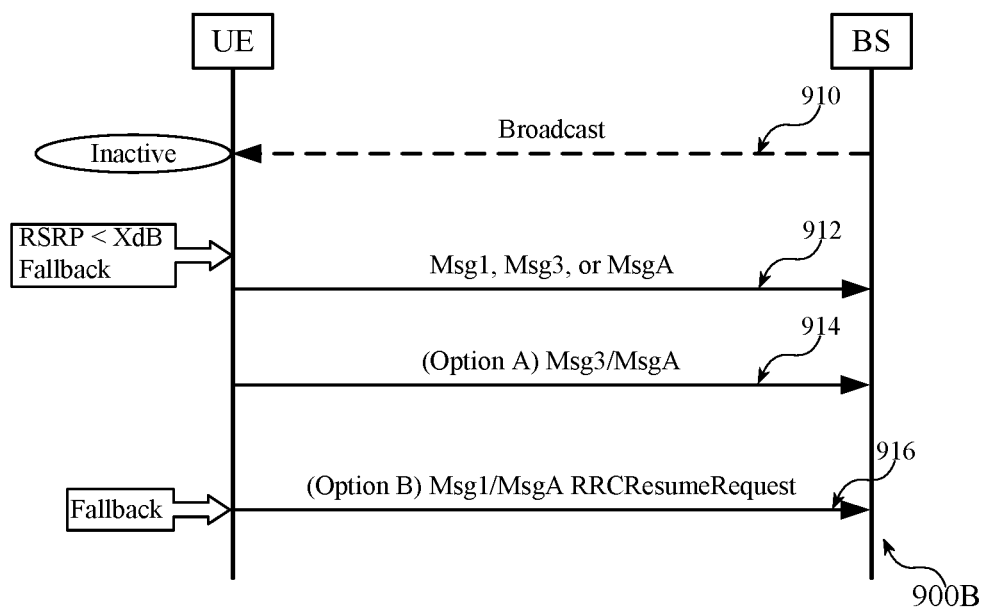
FIG. 9B illustrates a flow diagram of a method for a RACH INACTIVE state communication between a BS and a UE with a fallback mechanism to a RRC Resume process by failing to reaching a radio quality threshold.

FIG. 9B illustrates a flow diagram of a method 900B for a RACH INACTIVE state communication between a BS and a UE with a fallback mechanism to a RRC Resume process by failing to reaching a radio quality threshold. The UE is configured to suspend the RACH procedure for RRC INACTIVE data transmission according to an alternative suspend criteria than that described in 900A. When the alternative suspend criteria is met, the UE can fallback to a RRC resume process by transmitting a RRC ResumeRequest to follow a resume procedure that may include the procedure outlined in FIG. 1 and FIG. 2.

At 910, sometime before the UE may transmit or receive data, the BS can broadcast a message to the UE including various parameters. The parameters may include a radio link quality threshold and one or more additional parameters described at 902.

The alternative suspend criteria may include the radio link quality threshold. At 912, sometime before a MsgA, or MsgB; or before a Msg1, Msg2, Msg3, or Msg4 the radio link quality threshold may not be met. The UE may continue the RACH INACTIVE data communication and generate the Msg3 or MsgA PUSCH that includes a RRC ResumeRequest, such as shown at 914 in place of UL data. The UE may generate the Msg3 or MsgA PUSCH when the radio link quality threshold is not met. After the UE transmits the Msg3 or MsgA with the RRC ResumeRequest, the RACH process associated with the INACTIVE state communication can be suspended and can subsequently complete the RRC resume process, for example, as described in FIG. 1 and FIG. 2.

In an alternative aspect, when the radio link quality threshold is not met at 912, the UE may suspend the RACH procedure and fall back to a Msg1 or MsgA RRC resume process by transmitting a RRC ResumeRequest to the BS as in 916 Option B and can subsequently complete the RRC resume process, for example, as described in FIG. 1 and FIG. 2.

Figure 10:
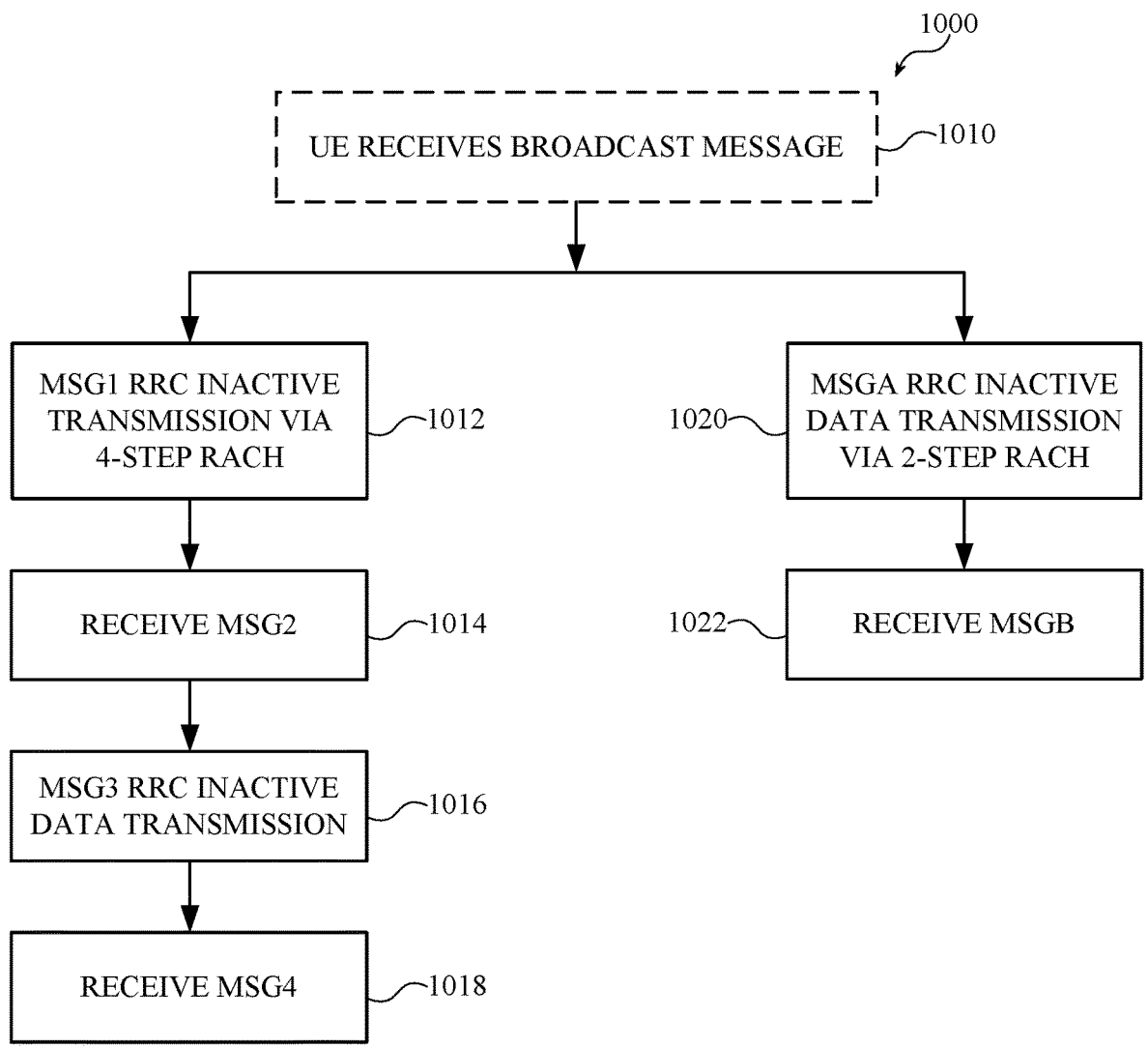
FIG. 10 is a flow diagram for a RRC INACTIVE data transmission for a UE.

FIG. 10 is a flow diagram 1000 for a RRC INACTIVE data transmission for a UE. At 1010, sometime before the UE may transmit or receive data, the UE can receive a broadcast message with various parameters. The parameters may include one or more of a RACH configuration, a RACH preamble, a UL grant, a transmission condition, and a Msg1 repetition number designated for INACTIVE state communication.

In response to a determination to perform a RRC INACTIVE data communication, the UE can begin a 4-step RACH procedure for RRC INACTIVE data communication at 1012. The UE can transmit a Msg1 which includes a RACH preamble via PRACH. The Msg1 may further include one or more of the Msg1 features and operations described in FIG. 5A through FIG. 8B.

At 1014 the UE receives a Msg2 and may include one or more of the Msg2 features and operations described in FIG. 5A through FIG. 8B. At 1016, the UE can transmit a Msg3 PUSCH with UL data via configured resources. The UE can transmit the Msg3 repetitively as described in FIG. 6A. The Msg3 may include one or more of the Msg3 features and operations described in FIG. 5A through FIG. 8B.

At 1018 the UE receives a Msg4 in response to the Msg3 PUSCH transmission. The Msg4 may include one or more of the Msg4 features and operations described in FIG. 5A through FIG. 8B.

In an alternative aspect, after 1010 and in response to a determination to perform a RRC INACTIVE data communication, the UE can begin a 2-step RACH procedure for RRC INACTIVE data communication at 1020. The UE can transmit a MsgA that can include a MsgA RACH preamble with a PRACH and can include a MsgA PUSCH. The UE can transmit the Msg3 repetitively as described in FIG. 6B.

The MsgA may further include one or more of the MsgA features and operations described in FIG. 5A through FIG. 8B.

At 1022 the UE can receive a MsgB in response to the MsgA PUSCH transmission. The MsgB may include one or more of the MsgB features and operations described in FIG. 5A through FIG. 8B.

The 2-step and 4-step RACH described in FIG. 10 can further be a dedicated RACH configuration for the RRC INACTIVE data transmission. The UE can select the RACH preamble from a dedicated preamble group for the RRC INACTIVE data transmission. Alternatively, the RACH preamble can be a shared preamble for the RACH procedure of the RRC INACTIVE data transmission and a RACH procedure of a RRC Resume procedure.

Figure 11:
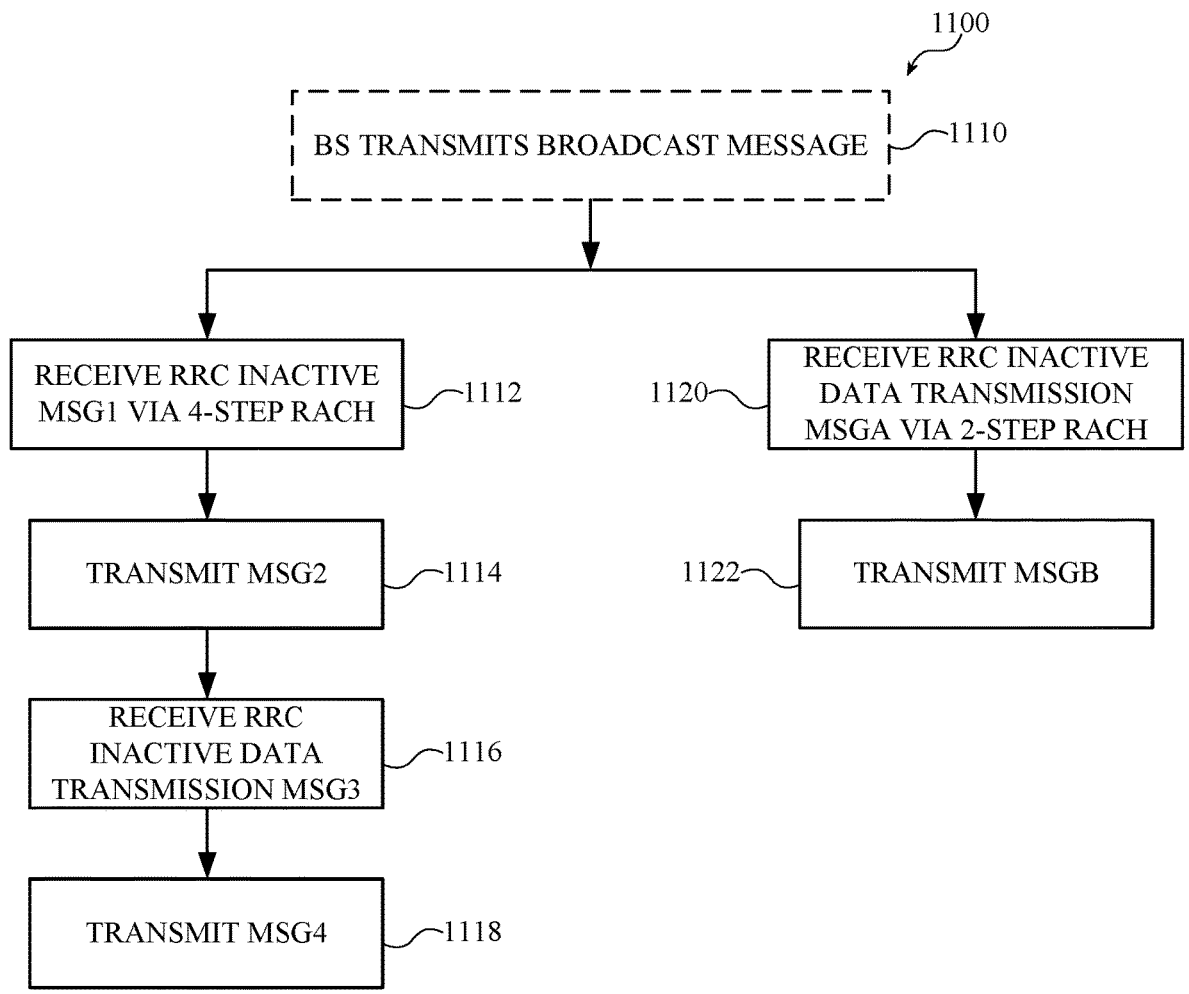
FIG. 11 is a flow diagram for a RRC INACTIVE data transmission for a BS.

FIG. 11 is a flow diagram 1100 for a RRC INACTIVE data transmission for a BS. At 1110, the BS can transmit a broadcast message with various parameters. The parameters may include one or more of a RACH configuration, a RACH preamble, a UL grant, a transmission condition, and a Msg1 repetition number designated for INACTIVE state communication.

The BS may receive a Msg1 which may include a RACH preamble with a PRACH. The RACH preamble with the PRACH can be associated with the RRC INACTIVE data transmission. After receiving the Msg1, the BS can begin a 4-step RACH procedure for RRC INACTIVE data communication at 1112. The Msg1 may further include one or more of the Msg1 features and operations described in FIG. 5A through FIG. 8B.

At 1114 the BS can transmit a Msg2 and may include one or more of the Msg2 features and operations described in FIG. 5A through FIG. 8B. At 1116, the BS can receive a Msg3 PUSCH with UL data via configured resources. The BS can receive the Msg3 repetitively as described in FIG. 6A. The Msg3 may include one or more of the Msg3 features and operations described in FIG. 5A through FIG. 8B.

At 1118 the BS can transmit a Msg4 during a CR window in response to the Msg3 PUSCH. The Msg4 may include one or more of the Msg4 features and operations described in FIG. 5A through FIG. 8B.

In an alternative aspect, after 1110 the BS can receive a MsgA designated for a 2-step RACH procedure for RRC INACTIVE data transmission at 1120. The MsgA can include a MsgA RACH preamble with a PRACH and can include a MsgA PUSCH with UL data via configured resources. The BS can receive the MsgA repetitively as described in FIG. 6B. The MsgA may further include one or more of the MsgA features and operations described in FIG. 5A through FIG. 8B.

At 1122 the BS can transmit a MsgB in response to the MsgA PUSCH transmission. The MsgB may include one or more of the MsgB features and operations described in FIG. 5A through FIG. 8B.

The 2-step and 4-step RACH described in FIG. 11 can further be a dedicated RACH configuration for the RRC INACTIVE data transmission. The BS can configure a dedicated RACH preamble group for the RRC INACTIVE data transmission, and the RACH preamble can be one of the dedicated RACH preamble group for the RRC INACTIVE data transmission. Alternatively, the RACH preamble can be a shared preamble for the RACH procedure of the RRC INACTIVE data transmission and a RACH procedure of a RRC Resume procedure.

Figure 12:
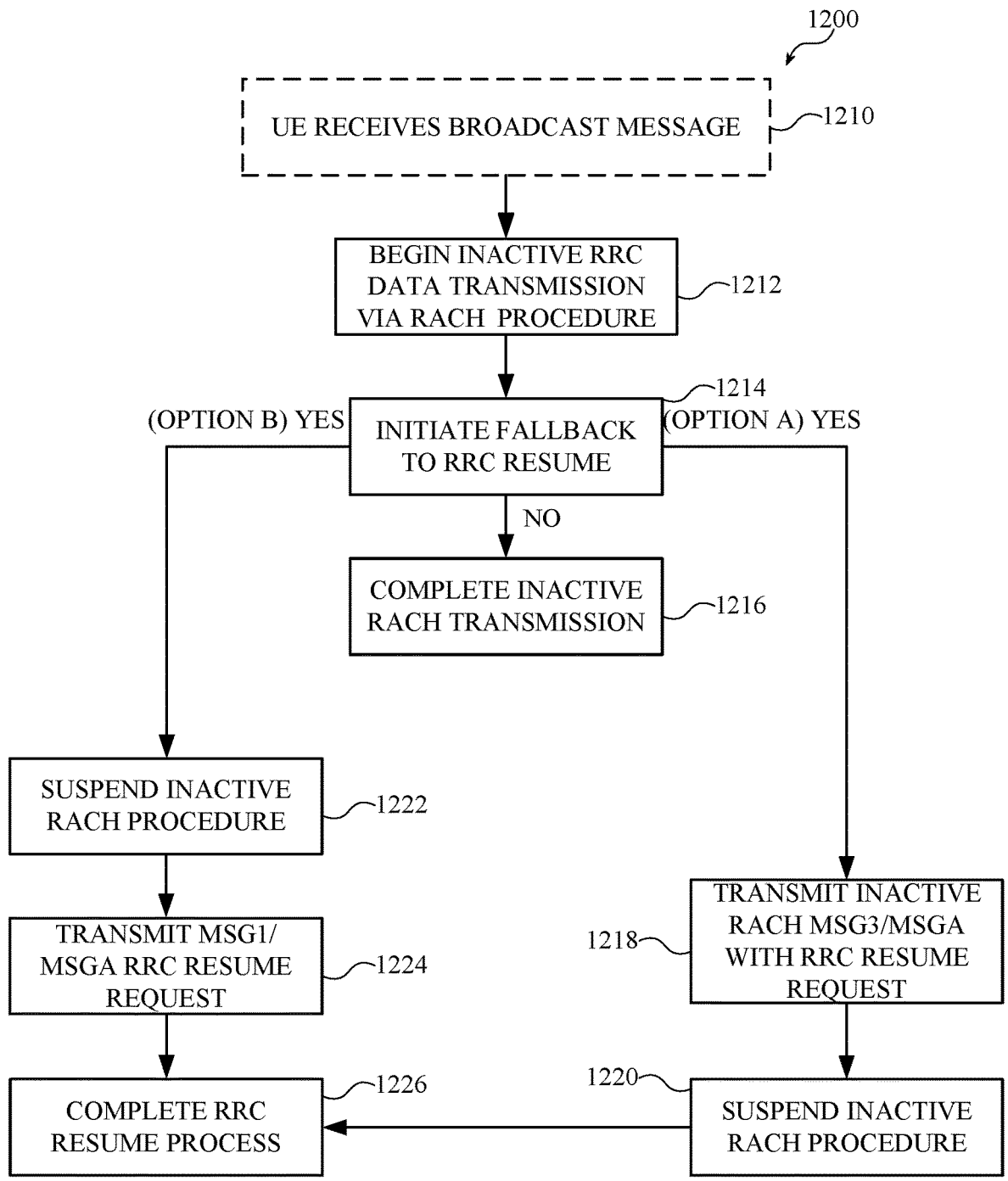
FIG. 12 is a flow diagram for a RRC INACTIVE data transmission for a UE with a fallback mechanism to a RRC Resume process.

FIG. 12 is a flow diagram 1200 for a RRC INACTIVE data transmission for a UE with a fallback mechanism to a RRC Resume process. At 1210 sometime before the UE may transmit or receive data, the UE can receive a broadcast a message including various parameters. The parameters may include one or more of a RACH preamble, RACH preamble retransmission number, RACH configuration, UL grant, radio link quality threshold, radio link timing threshold, Msg3 and/or MsgA repetition value.

The UE can engage in INACTIVE state communications through a 4-step or 2-step RACH procedure for the RRC INACTIVE data communication at 1212. The 4-step or 2-step RACH procedure for the RRC INACTIVE data communication can follow any aspects described in FIG. 5A through FIG. 8B. At 1214 the UE may initiate fallback to a RRC RESUME procedure by meeting a suspend criteria. The suspend criteria may include any failure of the RACH process. The RACH process can fail before or after a MsgA, or MsgB; or a Msg1, Msg2, Msg3, or Msg4. Furthermore, the failed RACH process can include unsuccessful completion of any step described with regards to FIG. 5A through FIG. 8B fulfilling the suspend criteria.

The suspend criteria may include meeting a retransmit value. The UE may be configured to retransmit the RACH preamble for the RRC inactive data transmission according to a retransmit value. The UE may retransmit the RACH preamble and reach the retransmit value fulfilling the suspend criteria.

The suspend criteria may include failure to meet a radio quality threshold. Sometime before the MsgA, or MsgB; or before the Msg1, Msg2, Msg3, or Msg4 the radio link quality threshold may not be met fulfilling the suspend criteria.

After fulfilling the suspend criteria, the UE can continue the RACH INACTIVE data communication and can generate the Msg3 or MsgA PUSCH that includes a RRC ResumeRequest, such as shown at 1218 in place of UL data. After the UE transmits the Msg3 or MsgA with the RRC ResumeRequest, the UE can suspend the RACH process associated with the INACTIVE state communication at 1220. The UE can then complete the RRC resume process at 1226, for example, as described in FIG. 1 and FIG. 2.

After fulfilling the suspend criteria, the UE can suspend the RACH process associated with the INACTIVE state communication, such as shown at 1222. At 1224 the UE can fallback to a Msg1 or MsgA RRC resume process by transmitting a RRC ResumeRequest. At 1226 the UE can complete the RRC resume process, for example, as described in FIG. 1 and FIG. 2.

If the suspend criteria is not met, the UE can complete the RACH INACTIVE data transmission at 1216 in accordance with the aspects described in FIG. 5A through FIG. 8B.

Figure 13:
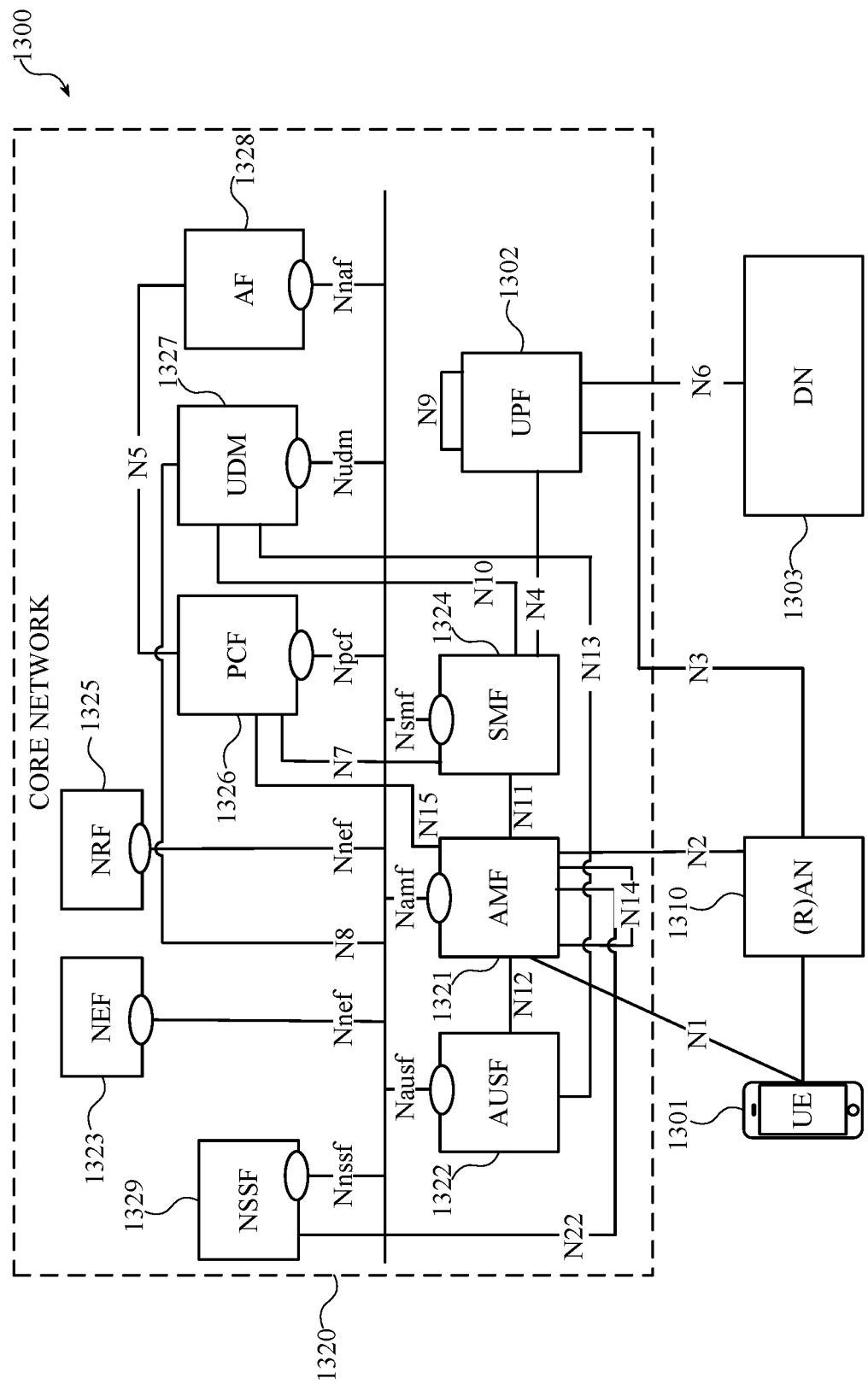
FIG. 13 is a block diagram illustrating an architecture of a system including a Core Network (CN), for example a Fifth Generation (5G) CN (5GC), in accordance with various aspects.

Aspects described herein can be implemented into a system using any suitably configured hardware and/or software. FIG. 13 illustrates an architecture of a system 1300 including a CN 1320, for example a Fifth Generation (5G) CN (5GC), in accordance with various aspects. The system 1300 is shown to include a UE 1301, which can be the same or similar to one or more other UEs discussed herein; a Third Generation Partnership Project (3GPP) Radio Access Network (Radio AN or RAN) or other (e.g., non-3GPP) AN, (R)AN 210, which can include one or more RAN nodes (e.g., Evolved Node B(s) (eNB(s)), next generation Node B(s) (gNB(s), and/or other nodes) or other nodes or access points; and a Data Network (DN) 1303, which can be, for example, operator services, Internet access or third party services; and a Fifth Generation Core Network (5GC) 1320. The 5GC 1320 can comprise one or more of the following functions and network components: an Authentication Server Function (AUSF) 1322; an Access and Mobility Management Function (AMF) 1321; a Session Management Function (SMF) 1324; a Network Exposure Function (NEF) 1323; a Policy Control Function (PCF) 1326; a Network Repository Function (NRF) 1325; a Unified Data Management (UDM) 1327; an Application Function (AF) 1328; a User Plane (UP) Function (UPF) 1302; and a Network Slice Selection Function (NSSF) 1329, which can be connected by various interfaces and/or reference points, for example, as shown in FIG. 13.

Figure 14:
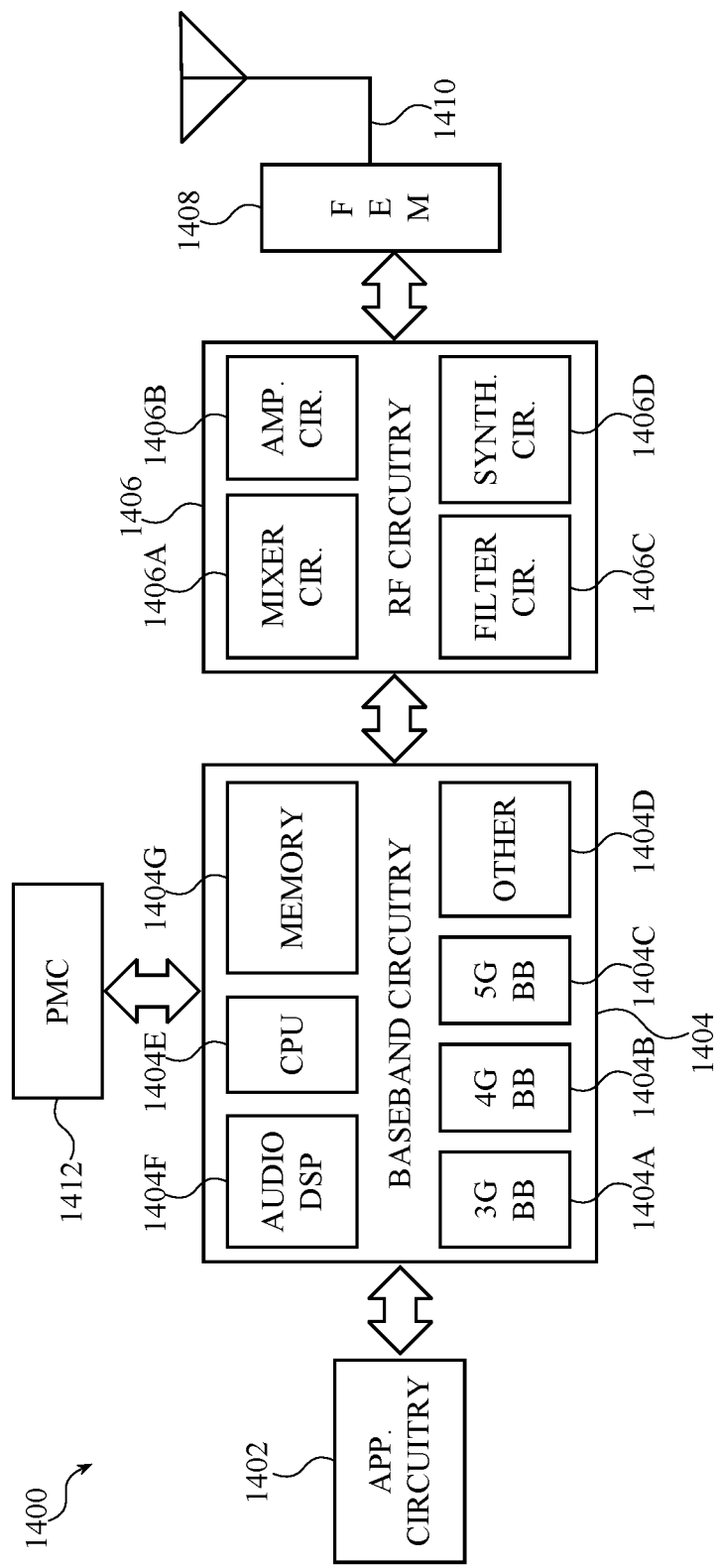
FIG. 14 is a diagram illustrating example components of a device that can be employed in accordance with various aspects discussed herein.

FIG. 14 illustrates example components of a device 1400 in accordance with some aspects. In some aspects, the device 1400 can include application circuitry 1402, baseband circuitry 1404, Radio Frequency (RF) circuitry 1406, front-end module (FEM) circuitry 1408, one or more antennas 1410, and power management circuitry (PMC) 1412 coupled together at least as shown. The components of the illustrated device 1400 can be included in a UE or a RAN node. In some aspects, the device 1400 can include fewer elements (e.g., a RAN node may not utilize application circuitry 1402, and instead include a processor/controller to process IP data received from a CN such as 5GC 1320 or an Evolved Packet Core (EPC)). In some aspects, the device 1400 can include additional elements such as, for example, memory/storage, display, camera, sensor (including one or more temperature sensors, such as a single temperature sensor, a plurality of temperature sensors at different locations in device 1400, etc.), or input/output (I/O) interface. In other aspects, the components described below can be included in more than one device (e.g., said circuitries can be separately included in more than one device for Cloud-RAN (C-RAN) implementations).

The application circuitry 1402 can include one or more application processors. For example, the application circuitry 1402 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 1400. In some aspects, processors of application circuitry 1402 can process IP data packets received from an EPC.

The baseband circuitry 1404 can include circuitry such as, but not limited to, one or more single-core or multi-core processors. The baseband circuitry 1404 can include one or more baseband processors or control logic to process baseband signals received from a receive signal path of the RF circuitry 1406 and to generate baseband signals for a transmit signal path of the RF circuitry 1406. Baseband processing circuitry 1404 can interface with the application circuitry 1402 for generation and processing of the baseband signals and for controlling operations of the RF circuitry 1406. For example, in some aspects, the baseband circuitry 1404 can include a third generation (3G) baseband processor 1404A, a fourth generation (4G) baseband processor 1404B, a fifth generation (5G) baseband processor 1404C, or other baseband processor(s) 1404D for other existing generations, generations in development or to be developed in the future (e.g., second generation (2G), sixth generation (6G), etc.). The baseband circuitry 1404 (e.g., one or more of baseband processors 1404A-D) can handle various radio control functions that enable communication with one or more radio networks via the RF circuitry 1406. In other aspects, some or all of the functionality of baseband processors 1404A-D can be included in modules stored in the memory 1404G and executed via a Central Processing Unit (CPU) 1404E. The radio control functions can include, but are not limited to, signal modulation/demodulation, encoding/decoding, radio frequency shifting, etc. In some aspects, modulation/demodulation circuitry of the baseband circuitry 1404 can include Fast-Fourier Transform (FFT), precoding, or constellation mapping/demapping functionality. In some aspects, encoding/decoding circuitry of the baseband circuitry 1404 can include convolution, tail-biting convolution, turbo, Viterbi, or Low Density Parity Check (LDPC) encoder/decoder functionality. Aspects of modulation/demodulation and encoder/decoder functionality are not limited to these examples and can include other suitable functionality in other aspects.

In some aspects, the baseband circuitry 1404 can include one or more audio digital signal processor(s) (DSP) 1404F. The audio DSP(s) 1404F can include elements for compression/decompression and echo cancellation and can include other suitable processing elements in other aspects. Components of the baseband circuitry can be suitably combined in a single chip, a single chipset, or disposed on a same circuit board in some aspects. In some aspects, some or all of the constituent components of the baseband circuitry 1404 and the application circuitry 1402 can be implemented together such as, for example, on a system on a chip (SOC).

In some aspects, the baseband circuitry 1404 can provide for communication compatible with one or more radio technologies. For example, in some aspects, the baseband circuitry 1404 can support communication with a NG-RAN, an evolved universal terrestrial radio access network (EU-TRAN) or other wireless metropolitan area networks (WMAN), a wireless local area network (WLAN), a wireless personal area network (WPAN), etc. Aspects in which the baseband circuitry 1404 is configured to support radio communications of more than one wireless protocol can be referred to as multi-mode baseband circuitry.

RF circuitry 1406 can enable communication with wireless networks using modulated electromagnetic radiation through a non-solid medium. In various aspects, the RF circuitry 1406 can include switches, filters, amplifiers, etc. to facilitate the communication with the wireless network. RF circuitry 1406 can include a receive signal path which can include circuitry to down-convert RF signals received from the FEM circuitry 1408 and provide baseband signals to the baseband circuitry 1404. RF circuitry 1406 can also include a transmit signal path which can include circuitry to up-convert baseband signals provided by the baseband circuitry 1404 and provide RF output signals to the FEM circuitry 1408 for transmission.

In some aspects, the receive signal path of the RF circuitry 1406 can include mixer circuitry 1406a, amplifier circuitry 1406b and filter circuitry 1406c. In some aspects, the transmit signal path of the RF circuitry 1406 can include filter circuitry 1406c and mixer circuitry 1406a. RF circuitry 1406 can also include synthesizer circuitry 1406d for synthesizing a frequency for use by the mixer circuitry 1406a of the receive signal path and the transmit signal path. In some aspects, the mixer circuitry 1406a of the receive signal path can be configured to down-convert RF signals received from the FEM circuitry 1408 based on the synthesized frequency provided by synthesizer circuitry 1406d. The amplifier circuitry 1406b can be configured to amplify the down-converted signals and the filter circuitry 1406c can be a low-pass filter (LPF) or band-pass filter (BPF) configured to remove unwanted signals from the down-converted signals to generate output baseband signals. Output baseband signals can be provided to the baseband circuitry 1404 for further processing. In some aspects, the output baseband signals can be zero-frequency baseband signals, although this is not a requirement. In some aspects, mixer circuitry 1406a of the receive signal path can comprise passive mixers, although the scope of the aspects is not limited in this respect.

In some aspects, the mixer circuitry 1406a of the transmit signal path can be configured to up-convert input baseband signals based on the synthesized frequency provided by the synthesizer circuitry 1406d to generate RF output signals for the FEM circuitry 1408. The baseband signals can be provided by the baseband circuitry 1404 and can be filtered by filter circuitry 1406c.

In some aspects, the mixer circuitry 1406a of the receive signal path and the mixer circuitry 1406a of the transmit signal path can include two or more mixers and can be arranged for quadrature downconversion and upconversion, respectively. In some aspects, the mixer circuitry 1406a of the receive signal path and the mixer circuitry 1406a of the transmit signal path can include two or more mixers and can be arranged for image rejection (e.g., Hartley image rejection). In some aspects, the mixer circuitry 1406a of the receive signal path and the mixer circuitry 1406a can be arranged for direct downconversion and direct upconversion, respectively. In some aspects, the mixer circuitry 1406a of the receive signal path and the mixer circuitry 1406a of the transmit signal path can be configured for super-heterodyne operation.

In some aspects, the output baseband signals and the input baseband signals can be analog baseband signals, although the scope of the aspects is not limited in this respect. In some alternate aspects, the output baseband signals and the input baseband signals can be digital baseband signals. In these alternate aspects, the RF circuitry 1406 can include analog-to-digital converter (ADC) and digital-to-analog converter (DAC) circuitry and the baseband circuitry 1404 can include a digital baseband interface to communicate with the RF circuitry 1406.

In some dual-mode aspects, a separate radio IC circuitry can be provided for processing signals for each spectrum, although the scope of the aspects is not limited in this respect.

In some aspects, the synthesizer circuitry 1406d can be a fractional-N synthesizer or a fractional N/N+1 synthesizer, although the scope of the aspects is not limited in this respect as other types of frequency synthesizers can be suitable. For example, synthesizer circuitry 1406d can be a delta-sigma synthesizer, a frequency multiplier, or a synthesizer comprising a phase-locked loop with a frequency divider.

The synthesizer circuitry 1406d can be configured to synthesize an output frequency for use by the mixer circuitry 1406a of the RF circuitry 1406 based on a frequency input and a divider control input. In some aspects, the synthesizer circuitry 1406d can be a fractional N/N+1 synthesizer.

In some aspects, frequency input can be provided by a voltage controlled oscillator (VCO), although that is not a requirement. Divider control input can be provided by either the baseband circuitry 1404 or the applications processor 1402 depending on the desired output frequency. In some aspects, a divider control input (e.g., N) can be determined from a look-up table based on a channel indicated by the applications processor 1402.

Synthesizer circuitry 1406d of the RF circuitry 1406 can include a divider, a delay-locked loop (DLL), a multiplexer and a phase accumulator. In some aspects, the divider can be a dual modulus divider (DMD) and the phase accumulator can be a digital phase accumulator (DPA). In some aspects, the DMD can be configured to divide the input signal by either N or N+1 (e.g., based on a carry out) to provide a fractional division ratio. In some example aspects, the DLL can include a set of cascaded, tunable, delay elements, a phase detector, a charge pump and a D-type flip-flop. In these aspects, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some aspects, synthesizer circuitry 1406d can be configured to generate a carrier frequency as the output frequency, while in other aspects, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some aspects, the output frequency can be a LO frequency (fLO). In some aspects, the RF circuitry 1406 can include an IQ/polar converter.

FEM circuitry 1408 can include a receive signal path which can include circuitry configured to operate on RF signals received from one or more antennas 1410, amplify the received signals and provide the amplified versions of the received signals to the RF circuitry 1406 for further processing. FEM circuitry 1408 can also include a transmit signal path which can include circuitry configured to amplify signals for transmission provided by the RF circuitry 1406 for transmission by one or more of the one or more antennas 1410. In various aspects, the amplification through the transmit or receive signal paths can be done solely in the RF circuitry 1406, solely in the FEM 1408, or in both the RF circuitry 1406 and the FEM 1408.

In some aspects, the FEM circuitry 1408 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 1406). The transmit signal path of the FEM circuitry 1408 can include a power amplifier (PA) to amplify input RF signals (e.g., provided by RF circuitry 1406), and one or more filters to generate RF signals for subsequent transmission (e.g., by one or more of the one or more antennas 1410).

In some aspects, the PMC 1412 can manage power provided to the baseband circuitry 1404. In particular, the PMC 1412 can control power-source selection, voltage scaling, battery charging, or DC-to-DC conversion. The PMC 1412 can often be included when the device 1400 is capable of being powered by a battery, for example, when the device is included in a UE. The PMC 1412 can increase the power conversion efficiency while providing desirable implementation size and heat dissipation characteristics.

While FIG. 14 shows the PMC 1412 coupled only with the baseband circuitry 1404. However, in other aspects, the PMC 1412 may be additionally or alternatively coupled with, and perform similar power management operations for, other components such as, but not limited to, application circuitry 1402, RF circuitry 1406, or FEM 1408.

In some aspects, the PMC 1412 can control, or otherwise be part of, various power saving mechanisms of the device 1400. For example, if the device 1400 is in an RRC_Connected state, where it is still connected to the RAN node as it expects to receive traffic shortly, then it can enter a state known as Discontinuous Reception Mode (DRX) after a period of inactivity. During this state, the device 1400 can power down for brief intervals of time and thus save power.

If there is no data traffic activity for an extended period of time, then the device 1400 can transition off to an RRC_Idle state, where it disconnects from the network and does not perform operations such as channel quality feedback, handover, etc. The device 1400 goes into a very low power state and it performs paging where again it periodically wakes up to listen to the network and then powers down again. The device 1400 may not receive data in this state; in order to receive data, it can transition back to RRC_Connected state.

An additional power saving mode can allow a device to be unavailable to the network for periods longer than a paging interval (ranging from seconds to a few hours). During this time, the device is totally unreachable to the network and can power down completely. Any data sent during this time incurs a large delay and it is assumed the delay is acceptable.

Processors of the application circuitry 1402 and processors of the baseband circuitry 1404 can be used to execute elements of one or more instances of a protocol stack. For example, processors of the baseband circuitry 1404, alone or in combination, can be used execute Layer 3, Layer 2, or Layer 1 functionality, while processors of the application circuitry 1404 can utilize data (e.g., packet data) received from these layers and further execute Layer 4 functionality (e.g., transmission communication protocol (TCP) and user datagram protocol (UDP) layers). As referred to herein, Layer 3 can comprise a radio resource control (RRC) layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node, described in further detail below.

Figure 15:
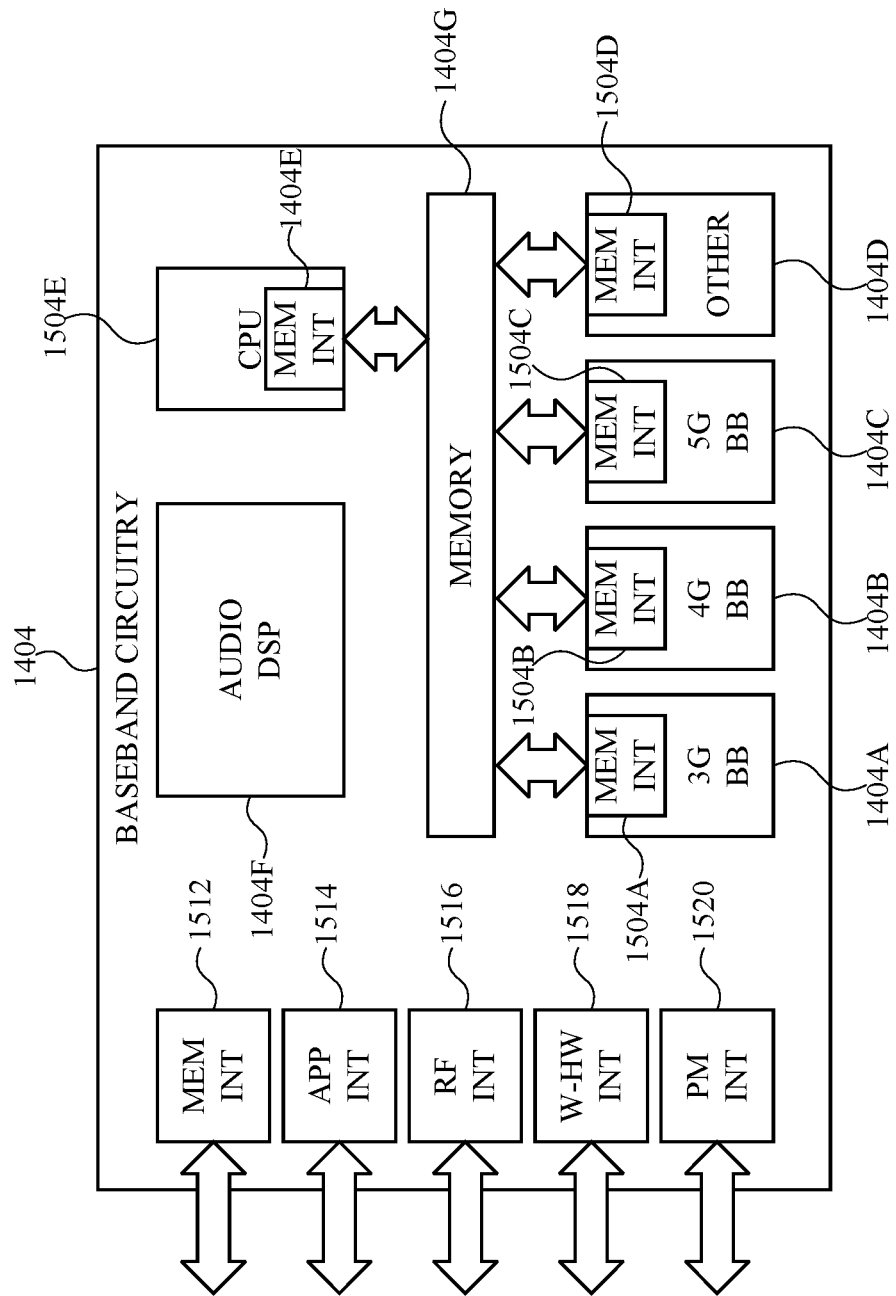
FIG. 15 is a diagram illustrating example interfaces of baseband circuitry that can be employed in accordance with various aspects discussed herein.

FIG. 15 illustrates example interfaces of baseband circuitry in accordance with some aspects. As discussed above, the baseband circuitry 1404 of FIG. 14 can comprise processors 1404A-1404E and a memory 1404G utilized by said processors. Each of the processors 1404A-1404E can include a memory interface, 1504A-1504E, respectively, to send/receive data to/from the memory 1404G.

The baseband circuitry 1404 can further include one or more interfaces to communicatively couple to other circuitries/devices, such as a memory interface 1512 (e.g., an interface to send/receive data to/from memory external to the baseband circuitry 1404), an application circuitry interface 1514 (e.g., an interface to send/receive data to/from the application circuitry 1402 of FIG. 14), an RF circuitry interface 316 (e.g., an interface to send/receive data to/from RF circuitry 1406 of FIG. 14), a wireless hardware connectivity interface 1518 (e.g., an interface to send/receive data to/from Near Field Communication (NFC) components, Bluetooth® components (e.g., Bluetooth® Low Energy), Wi-Fi® components, and other communication components), and a power management interface 1520 (e.g., an interface to send/receive power or control signals to/from the PMC 1412).

As discussed in greater detail herein, various aspects, which can be employed, for example, at a UE, can facilitate power management in connection with wireless modem(s). Various aspects can employ power management techniques discussed herein, wherein, based on monitored levels of power consumption and temperature, one or more power management stages discussed herein can be employed to mitigate overheating. Power management stages discussed herein can reduce power consumption and associated overheating caused by 5G (Fifth Generation) NR (New Radio) operation, LTE (Long Term Evolution) operation, or both.

Figure 16:
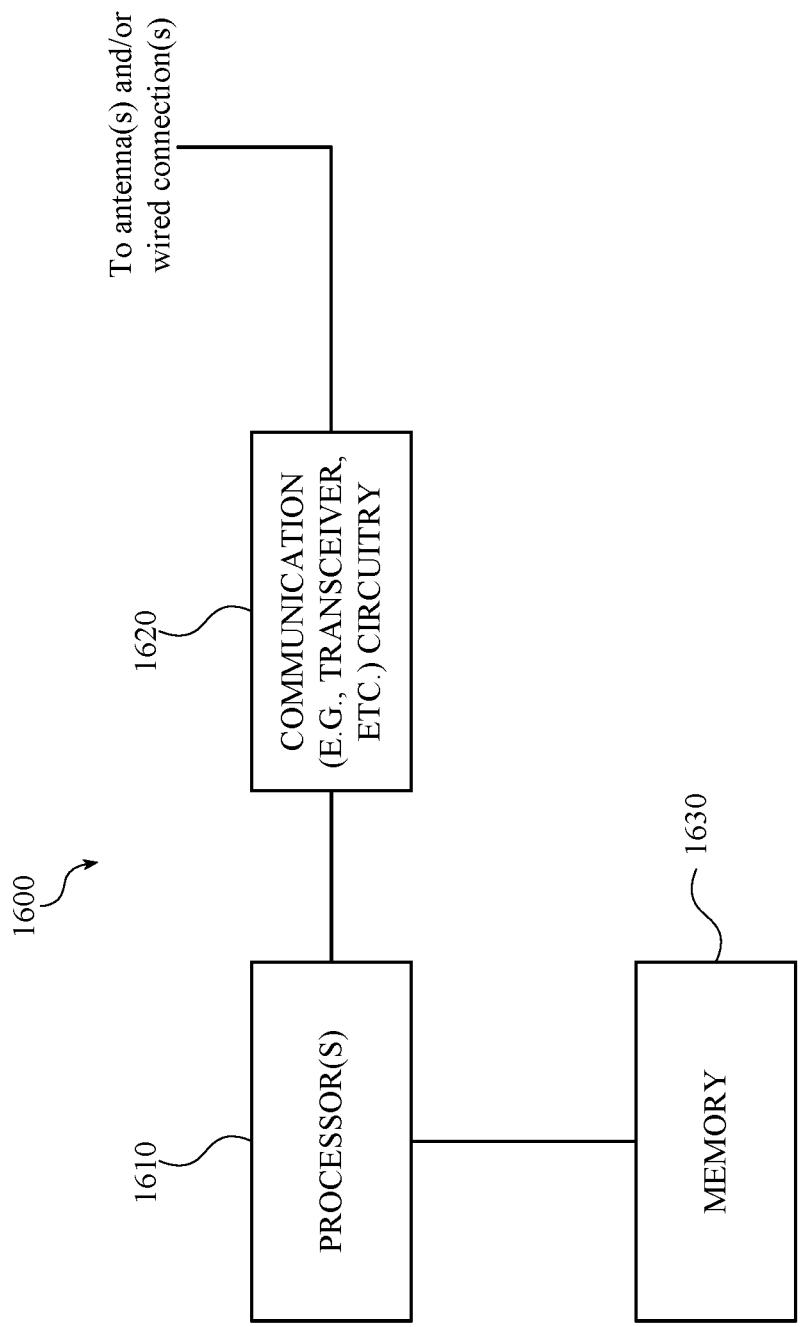
FIG. 16 is a block diagram illustrating a system that facilitates power management in connection with wireless modem(s), according to various aspects discussed herein.

Referring to FIG. 16, illustrated is a block diagram of a system 1600 employable at a UE (User Equipment), a next generation Node B (gNodeB or gNB) or other BS (base station)/TRP (Transmit/Receive Point), or another component of a 3GPP (Third Generation Partnership Project) network (e.g., a 5GC (Fifth Generation Core Network)) component or function such as a UPF (User Plane Function)) that facilitates power management in connection with wireless modem(s), according to various aspects discussed herein. System 1600 can include processor(s) 1610, communication circuitry 1620, and memory 1630. Processor(s) 1610 (e.g., which can comprise one or more of 1402 and/or 1404A-1404F, etc.) can comprise processing circuitry and associated interface(s) (e.g., a communication interface (e.g., RF circuitry interface 1516) for communicating with communication circuitry 1620, a memory interface (e.g., memory interface 1512) for communicating with memory 1630, etc.). Communication circuitry 1620 can comprise, for example circuitry for wired and/or wireless connection(s) (e.g., 1406 and/or 1408), which can include transmitter circuitry (e.g., associated with one or more transmit chains) and/or receiver circuitry (e.g., associated with one or more receive chains), wherein transmitter circuitry and receiver circuitry can employ common and/or distinct circuit elements, or a combination thereof). Memory 1630 can comprise one or more memory devices (e.g., memory 1404G, local memory (e.g., including CPU register(s)) of processor(s) discussed herein, etc.) which can be of any of a variety of storage mediums (e.g., volatile and/or non-volatile according to any of a variety of technologies/constructions, etc.), and can store instructions and/or data associated with one or more of processor(s) 1610 or transceiver circuitry 1620).

Specific types of aspects of system 1600 (e.g., UE aspects) can be indicated via subscripts (e.g., system 1600$_{UE}$ comprising processor(s) 1610$_{UE}$, communication circuitry 1620$_{UE}$, and memory 1630$_{UE}$). In some aspects, such as BS aspects (e.g., system 1600$_{gNB}$) and network component (e.g., UPF (User Plane Function), etc.) aspects (e.g., system 1600$_{UPF}$) processor(s) 1610$_{gNB}$ (etc.), communication circuitry (e.g., 1620$_{gNB}$, etc.), and memory (e.g., 1630$_{gNB}$, etc.) can be in a single device or can be included in different devices, such as part of a distributed architecture. In aspects, signaling or messaging between different aspects of system 1600 (e.g., 1600$_1$ and 1600$_2$) can be generated by processor(s) 1610$_1$, transmitted by communication circuitry 1620$_1$ over a suitable interface or reference point (e.g., a 3GPP air interface, N3, N4, etc.), received by communication circuitry 1620$_2$, and processed by processor(s) 1610$_2$. Depending on the type of interface, additional components (e.g., antenna(s), network port(s), etc. associated with system(s) 1600$_1$ and 1600$_2$) can be involved in this communication. The baseband circuitry 1404 can further include one or more interfaces to communicatively couple to other circuitries/devices, such as the communication circuitry 1620.

In various aspects, one or more of information (e.g., system information, resources associated with signaling, etc.), features, parameters, etc. can be configured to a UE via signaling (e.g., associated with one or more layers, such as L1 signaling or higher layer signaling (e.g., MAC, RRC, etc.)) from a gNB or other access point (e.g., via signaling generated by processor(s) 1610$_{gNB}$, transmitted by communication circuitry 1620$_{gNB}$, received by communication circuitry 1620$_{UE}$, and processed by processor(s) 1610$_{UE}$).

Depending on the type of information, features, parameters, etc., the type of signaling employed and/or the exact details of the operations performed at the UE and/or gNB in processing (e.g., signaling structure, handling of PDU(s)/SDU(s), etc.) can vary. However, for convenience, such operations can be referred to herein as configuring information/feature(s)/parameter(s)/etc. to a UE, generating or processing configuration signaling, or via similar terminology.

ADDITIONAL EXAMPLES

Examples herein can include subject matter such as a method, means for performing acts or blocks of the method, at least one machine-readable medium including executable instructions that, when performed by a machine (e.g., a processor (e.g., processor, etc.) with memory, an application-specific integrated circuit (ASIC), a field programmable gate array (FPGA), or the like) cause the machine to perform acts of the method or of an apparatus or system for concurrent communication using multiple communication technologies according to aspects and examples described.

Example 1 is a baseband processor, comprising: a memory interface; and processing circuitry communicatively coupled to the memory interface and configured to perform operations comprising: in response to a determination to perform a Radio Resource Control (RRC) inactive data transmission: generating a message 1 (Msg1) or a message A (MsgA) preamble based on a Random Access Channel (RACH) configuration for the RRC inactive data transmission; generating a message 3 (Msg3) or a MsgA Physical Uplink Shared Channel (PUSCH) comprising uplink (UL) data via configured resources; and receiving a message 4 (Msg4) or a message B (MsgB) in response to the Msg3 or the MsgA PUSCH.

Example 2 comprises the subject matter of any variation of any of example(s) 1, wherein the RACH configuration is a dedicated RACH configuration for the RRC inactive data transmission.

Example 3 comprises the subject matter of any variation of any of example(s) 1, wherein the operations further comprise selecting the preamble from a dedicated preamble group for the RRC inactive data transmission.

Example 4 comprises the subject matter of any variation of any of example(s) 1, wherein the preamble is a shared preamble for the RACH configuration of the RRC inactive data transmission and a RACH procedure of a RRC resume procedure.

Example 5 comprises the subject matter of any variation of any of example(s) 1-4, wherein the UL data is less than or equal to a preconfigured uplink data size; and wherein the determination is based on at least one of a predefined radio link quality threshold or a predefined radio link timing threshold.

Example 6 comprises the subject matter of any variation of any of example(s) 1-5, wherein the Msg3 or MsgA PUSCH is assigned a repetition value, the repetition value determined by the processing circuitry based on a radio link quality or one or more of a L1, L2, or L3 signaling; wherein a Hybrid Automatic Repeat Request (HARQ) process or a L1 process generates one or more repetitions of the Msg3 or MsgA PUSCH based at least in part on the repetition value; and wherein the operations further comprise, after a final repetition of the one or more repetitions, starting one of a random access response (RAR) window associated with the MsgB or a contention resolution (CR) timer associated with the Msg4.

Example 7 comprises the subject matter of any variation of any of example(s) 1-6, wherein the Msg3 or MsgA PUSCH comprises a medium access control control element (MAC CE) comprising an inactive radio network temporary identifier (I-RNTI), or a truncated I-RNTI (I-RNTI/truncated I-RNTI) or the operations further comprise scrambling the Msg3 or MsgA PUSCH based on the I-RNTI/truncated I-RNTI.

Example 8 comprises the subject matter of any variation of any of example(s) 7, wherein the operations comprise receiving the MsgB, and wherein the MsgB comprises a random access response (RAR) and the MAC CE comprising the I-RNTI; or the MsgB comprises at least one of an uplink (UL) grant scrambled by the I-RNTI/truncated I-RNTI or a downlink (DL) assignment scrambled by the I-RNTI/truncated I-RNTI.

Example 9 comprises the subject matter of any variation of any of example(s) 7, wherein the operations comprise generating the Msg3, and wherein the operations further comprise: starting a contention resolution (CR) timer after transmitting the Msg3, the CR timer set to end at a CR duration limit; and receiving the Msg4 before the CR duration limit; wherein the Msg4 comprises at least one of an uplink (UL) grant scrambled by the I-RNTI/truncated I-RNTI or a downlink (DL) assignment scrambled by the I-RNTI/truncated I-RNTI, or the Msg4 comprises a downlink (DL) assignment that schedules the baseband processor based at least on a temporary cell radio network temporary identifier (T-C-RNTI), wherein the DL assignment that schedules the baseband processor based at least on the T-C-RNTI comprises the MAC CE comprising the I-RNTI.

Example 10 is a User Equipment (UE) device, comprising: communication circuitry; and a processor configured to perform operations comprising: in response to a determination to perform a Radio Resource Control (RRC) inactive data transmission: transmitting, via the communication circuitry, a message 1 (Msg1) or a message A (MsgA) preamble based on a Random Access Channel (RACH) configuration for the RRC inactive data transmission; transmitting, via the communication circuitry a message 3 (Msg3) or a MsgA Physical Uplink Shared Channel (PUSCH) comprising uplink (UL) data via configured resources; and receiving, via the communication circuitry, a message 4 (Msg4) or a message B (MsgB) in response to the Msg3 or the MsgA PUSCH.

Example 11 comprises the subject matter of any variation of any of example(s) 10, wherein the RACH configuration is a dedicated RACH configuration for the RRC inactive data transmission.

Example 12 comprises the subject matter of any variation of any of example(s) 10, wherein the operations further comprise selecting the preamble from a dedicated preamble group for the RRC inactive data transmission.

Example 13 comprises the subject matter of any variation of any of example(s) 10, wherein the preamble is a shared preamble for the RACH configuration of the RRC inactive data transmission and a RACH procedure of a RRC resume procedure.

Example 14 comprises the subject matter of any variation of any of example(s) 10-14, wherein the UL data is less than or equal to a preconfigured uplink data size; and wherein the determination is based on at least one of a predefined radio link quality threshold or a predefined radio link timing threshold.

Example 15 comprises the subject matter of any variation of any of example(s) 10-15, wherein the Msg3 or MsgA PUSCH is assigned a repetition value, the repetition value determined by the machine-readable medium based on a radio link quality or one or more of a L1, L2, or L3 signaling; wherein a Hybrid Automatic Repeat Request (HARQ) process or a L1 process transmits one or more repetitions of the Msg3 or MsgA PUSCH based at least in part on the repetition value; and after a final repetition of the one or more repetitions, the operations further comprise starting one of a RAR window associated with the MsgB or a contention resolution (CR) timer associated with the Msg4.

Example 16 comprises the subject matter of any variation of any of example(s) 10-13, wherein the Msg3 or MsgA PUSCH comprises a medium access control control element (MAC CE) comprising an inactive radio network temporary identifier (I-RNTI), or a truncated I-RNTI (I-RNTI/truncated I-RNTI) or the operations further comprise scrambling the Msg3 or MsgA PUSCH based on the I-RNTI/truncated I-RNTI.

Example 17 comprises the subject matter of any variation of any of example(s) 16, wherein the operations comprise receiving the MsgB, wherein the MsgB comprises a random access response (RAR) and the MAC CE comprising the I-RNTI; or the MsgB comprises at least one of an uplink (UL) grant scrambled by the I-RNTI/truncated I-RNTI or a downlink (DL) assignment scrambled by the I-RNTI/truncated I-RNTI.

Example 18 comprises the subject matter of any variation of any of example(s) 16, wherein the operations comprise transmitting the Msg3, and wherein the operations further comprise: starting a contention resolution (CR) timer after transmitting the Msg3, the CR timer set to end at a CR duration limit; and receiving the Msg4 before the CR duration limit; wherein the Msg4 comprises at least one of an uplink (UL) grant scrambled by the I-RNTI/truncated I-RNTI or a downlink (DL) assignment scrambled by the I-RNTI/truncated I-RNTI, or the Msg4 comprises a downlink (DL) assignment that schedules the UE device based at least on a temporary cell radio network temporary identifier (T-C-RNTI), wherein the DL assignment that schedules the UE device based at least on the T-C-RNTI comprises the MAC CE comprising the I-RNTI.

Example 19 is a baseband processor, comprising: a memory interface; and processing circuitry communicatively coupled to the memory interface and configured to perform operations comprising: suspending a Random Access Channel (RACH) procedure for a Radio Resource Control (RRC) inactive data transmission; and generating a RRC resume request.

Example 20 comprises the subject matter of any variation of any of example(s) 19, wherein the RACH procedure for the RRC inactive data transmission is suspended in response to a failure of the RACH procedure for the RRC inactive data transmission.

Example 21 comprises the subject matter of any variation of any of example(s) 19-20, wherein the operations further comprise generating a RACH preamble for the RRC inactive data transmission N times, wherein N is a threshold that is one of configured or pre-defined, wherein the RACH procedure for the RRC inactive data transmission is suspended in response to generating the RACH preamble for the RRC inactive data transmission N times.

Example 22 comprises the subject matter of any variation of any of example(s) 19-21, wherein the operations further comprise determining whether a radio link quality meets a threshold for a generation of a RACH preamble for the RRC inactive data transmission, and wherein the RACH procedure is suspended in response to the radio link quality threshold not meeting the threshold for the generation of the RACH preamble.

Example 23 comprises the subject matter of any variation of any of example(s) 19-22, wherein after suspending the RACH procedure a new RACH procedure associated with a RRC resume request begins which includes generating the RRC resume request.

Example 24 comprises the subject matter of any variation of any of example(s) 19-23, wherein the operations further comprise: generating a RACH preamble for the RRC inactive data transmission; and generating, based at least in part on the RACH preamble for the RRC inactive data transmission, a message 3 (Msg3) or a message A (MsgA) Physical Uplink Shared Channel (PUSCH) that comprises the RRC Resume Request.

Example 25 is a baseband processor, comprising: a memory interface; and processing circuitry communicatively coupled to the memory interface and configured to perform operations comprising: receiving a message 1 (Msg1) or a message A (MsgA) preamble based on a Random Access Channel (RACH) configuration for a Radio Resource Control (RRC) inactive data transmission; receiving a message 3 (Msg3) or a MsgA Physical Uplink Shared Channel (PUSCH) comprising uplink (UL) data via configured resources; and generating a message 4 (Msg4) or a message B (MsgB) in response to the Msg3 or the MsgA PUSCH.

Example 26 comprises the subject matter of any variation of any of example(s) 25, wherein the RACH configuration is a dedicated RACH configuration for the RRC inactive data transmission.

Example 27 comprises the subject matter of any variation of any of example(s) 25, wherein the operations further comprise configuring a dedicated preamble group, and the Msg1 or MsgA preamble is one of the dedicated preamble group for the RRC inactive data transmission.

Example 28 comprises the subject matter of any variation of any of example(s) 25, wherein the preamble is a shared preamble for the RACH configuration of the RRC inactive data transmission and a RACH configuration of a RRC resume procedure.

Example 29 comprises the subject matter of any variation of any of example(s) 25-28, wherein the operations further comprise: configuring an uplink data size for the RRC inactive data transmission, and configure a radio link quality threshold for the RRC inactive data transmission, or configure a radio link timing threshold for the RRC inactive data transmission based on one or more of a Timing Advance (TA) or a Time Alignment Command (TAC).

Example 30 comprises the subject matter of any variation of any of example(s) 25-29, wherein the operations further comprise: configuring a radio link quality threshold to determine a repetition value for the Msg3 or the MsgA PUSCH or configure the repetition value and generating a message 2 (Msg2) with the repetition value; receiving one or more repetitions of the Msg3 or the MsgA PUSCH according to the repetition value; and after a final reception of the one or more repetitions, generating the Msg4 or the MsgB.

Example 31 comprises the subject matter of any variation of any of example(s) 25-30, wherein the Msg3 or the MsgA PUSCH comprises a medium access control control element (MAC CE) that comprises an inactive radio network temporary identifier (I-RNTI) or a truncated I-RNTI (I-RNTI/truncated I-RNTI) associated with the RRC inactive data transmission, or the Msg3 or the MsgA PUSCH is scrambled with the I-RNTI/truncated I-RNTI, and wherein the operations further comprise determining the I-RNTI/truncated I-RNTI associated with the RRC inactive data transmission based on one of: the MAC CE that comprises the I-RNTI/truncated I-RNTI, or descrambling the Msg3 or MsgA PUSCH with a set of potential I-RNTIs/truncated I-RNTIs that comprises the I-RNTI/truncated I-RNTI.

Example 32 comprises the subject matter of any variation of any of example(s) 31, wherein the operations comprise generating the MsgB, and wherein the MsgB comprises a random access response (RAR) and the MAC CE comprising the I-RNTI/truncated I-RNTI; or the MsgB comprises at least one of an uplink (UL) grant scrambled by the I-RNTI/truncated I-RNTI or a downlink (DL) assignment scrambled by the I-RNTI/truncated I-RNTI.

Example 33 comprises the subject matter of any variation of any of example(s) 31, wherein the operations comprise generating the Msg4; wherein the Msg4 comprises at least one of an uplink (UL) grant scrambled by the I-RNTI/truncated I-RNTI or a downlink (DL) assignment scrambled by the I-RNTI/truncated I-RNTI, or wherein the Msg4 comprises a DL assignment with a schedule at least partially based on a temporary cell radio network temporary identifier (T-C-RNTI), wherein the DL assignment with the schedule at least partially based on the T-C-RNTI comprises the MAC CE comprising the I-RNTI.

Example 34 is a machine-readable medium comprising instructions that, when executed, cause a Base Station (BS) to: receive a message 1 (Msg1) or a message A (MsgA) preamble based on a Random Access Channel (RACH) configuration for a Radio Resource Control (RRC) inactive data transmission; receive a message 3 (Msg3) or a MsgA Physical Uplink Shared Channel (PUSCH) comprising uplink (UL) data via configured resources; and transmit a message 4 (Msg4) or a message B (MsgB) in response to the Msg3 or the MsgA PUSCH.

Example 35 comprises the subject matter of any variation of any of example(s) 34, wherein the RACH configuration is a dedicated RACH configuration for the RRC inactive data transmission.

Example 36 comprises the subject matter of any variation of any of example(s) 34, wherein the instructions, when executed, further cause the BS to configure a dedicated preamble group, and the Msg1 or MsgA preamble is one of the dedicated preamble group for the RRC inactive data transmission.

Example 37 comprises the subject matter of any variation of any of example(s) 34, wherein the preamble is a shared preamble for the RACH configuration of the RRC inactive data transmission and a RACH configuration of a RRC resume procedure.

Example 38 comprises the subject matter of any variation of any of example(s) 34-37, wherein the instructions, when executed, further cause the BS to: configure an uplink data size for the RRC inactive data transmission, and configure a radio link quality threshold for the RRC inactive data transmission, or configure a radio link timing threshold for the RRC inactive data transmission based on one or more of a Timing Advance (TA) or a Time Alignment Command (TAC).

Example 39 comprises the subject matter of any variation of any of example(s) 34-38, wherein the instructions, when executed, further cause the BS to: configure a radio link quality threshold to determine a repetition value for the Msg3 or the MsgA PUSCH or configure the repetition value and transmit a message 2 (Msg2) with the repetition value; receive one or more repetitions of the Msg3 or the MsgA PUSCH according to the repetition value; and after a final reception of the one or more repetitions, transmit the Msg4 or the MsgB.

Example 40 comprises the subject matter of any variation of any of example(s) 34-39, wherein the Msg3 or the MsgA PUSCH comprises a medium access control control element (MAC CE) that comprises an inactive radio network temporary identifier (I-RNTI) or a truncated I-RNTI (I-RNTI/truncated I-RNTI) associated with the RRC inactive data transmission, or the Msg3 or the MsgA PUSCH is scrambled with the I-RNTI/truncated I-RNTI, and wherein the instructions, when executed, further cause the BS to determine the I-RNTI/truncated I-RNTI associated with the RRC inactive data transmission based on one of: the MAC CE that comprises the I-RNTI/truncated I-RNTI, or descramble the Msg3 or MsgA PUSCH with a set of potential I-RNTIs/truncated I-RNTIs that comprises the I-RNTI/truncated I-RNTI.

Example 41 comprises the subject matter of any variation of any of example(s) 40, wherein the instructions, when executed, transmit the MsgB, and wherein the MsgB comprises a random access response (RAR) and the MAC CE comprising the I-RNTI/truncated I-RNTI; or the MsgB comprises at least one of an uplink (UL) grant scrambled by the I-RNTI/truncated I-RNTI or a downlink (DL) assignment scrambled by the I-RNTI/truncated I-RNTI.

Example 42 comprises the subject matter of any variation of any of example(s) 40, wherein the instructions, when executed, transmit the Msg4; wherein the Msg4 comprises at least one of an uplink (UL) grant scrambled by the I-RNTI/truncated I-RNTI or a downlink (DL) assignment scrambled by the I-RNTI/truncated I-RNTI, or wherein the Msg4 comprises a DL assignment with a schedule at least partially based on a temporary cell radio network temporary identifier (T-C-RNTI), wherein the DL assignment with the schedule at least partially based on the T-C-RNTI comprises the MAC CE comprising the I-RNTI.

Example 43 is a Base Station (BS) comprising: communication circuitry; and one or more processors communicatively coupled to the communication circuitry and configured to: receive, via the communication circuitry, a message 1 (Msg1) or a message A (MsgA) preamble based on a Random Access Channel (RACH) configuration for a Radio Resource Control (RRC) inactive data transmission; receive, via the communication circuitry, a message 3 (Msg3) or a MsgA Physical Uplink Shared Channel (PUSCH) comprising uplink (UL) data via configured resources; and transmit, via the communication circuitry, a message 4 (Msg4) or a message B (MsgB) in response to the Msg3 or the MsgA PUSCH.

Example 44 comprises the subject matter of any variation of any of example(s) 43, wherein the RACH configuration is a dedicated RACH configuration for the RRC inactive data transmission.

Example 45 comprises the subject matter of any variation of any of example(s) 43, wherein the one or more processors configures a dedicated preamble group, and the Msg1 or MsgA preamble is one of the dedicated preamble group for the RRC inactive data transmission.

Example 46 comprises the subject matter of any variation of any of example(s) 43, wherein the preamble is a shared preamble for the RACH configuration of the RRC inactive data transmission and a RACH configuration of a RRC resume procedure.

Example 47 comprises the subject matter of any variation of any of example(s) 43-46, wherein the one or more processors are further configured to: configure an uplink data size for the RRC inactive data transmission, and configure a radio link quality threshold for the RRC inactive data transmission, or configure a radio link timing threshold for the RRC inactive data transmission based on one or more of a Timing Advance (TA) or a Time Alignment Command (TAC).

Example 48 comprises the subject matter of any variation of any of example(s) 43-47, wherein the one or more processors are further configured to: configure a radio link quality threshold to determine a repetition value for the Msg3 or the MsgA PUSCH or configure the repetition value and transmit a message 2 (Msg2) with the repetition value; receive one or more repetitions of the Msg3 or the MsgA PUSCH according to the repetition value; and after a final reception of the one or more repetitions, transmit the Msg4 or the MsgB.

Example 49 comprises the subject matter of any variation of any of example(s) 43-48, wherein the Msg3 or the MsgA PUSCH comprises a medium access control control element (MAC CE) that comprises an inactive radio network temporary identifier (I-RNTI) or a truncated I-RNTI (I-RNTI/truncated I-RNTI) associated with the RRC inactive data transmission, or the Msg3 or the MsgA PUSCH is scrambled with the I-RNTI/truncated I-RNTI, and wherein the one or more processors are further configured to determine the I-RNTI/truncated I-RNTI associated with the RRC inactive data transmission based on one of: the MAC CE that comprises the I-RNTI/truncated I-RNTI, or descramble the Msg3 or MsgA PUSCH with a set of potential I-RNTIs/truncated I-RNTIs that comprises the I-RNTI/truncated I-RNTI.

Example 50 comprises the subject matter of any variation of any of example(s) 49, wherein the one or more processors transmits the MsgB, and wherein the MsgB comprises a random access response (RAR) and the MAC CE comprising the I-RNTI/truncated I-RNTI; or the MsgB comprises at least one of an uplink (UL) grant scrambled by the I-RNTI/truncated I-RNTI or a downlink (DL) assignment scrambled by the I-RNTI/truncated I-RNTI.

Example 51 comprises the subject matter of any variation of any of example(s) 49, wherein the one or more processors transmits the Msg4; wherein the Msg4 comprises at least one of an uplink (UL) grant scrambled by the I-RNTI/truncated I-RNTI or a downlink (DL) assignment scrambled by the I-RNTI/truncated I-RNTI, or wherein the Msg4 comprises a DL assignment with a schedule at least partially based on a temporary cell radio network temporary identifier (T-C-RNTI), wherein the DL assignment with the schedule at least partially based on the T-C-RNTI comprises the MAC CE comprising the I-RNTI.

Example 52 comprises an apparatus comprising means for executing any of the described operations of examples 1-24.

Example 53 comprises a machine readable medium that stores instructions for execution by a processor to perform any of the described operations of examples 1-24.

Example 54 comprises an apparatus comprising: a memory interface; and processing circuitry configured to: perform any of the described operations of examples 1-24.

Example 55 comprises a User Equipment (UE) configured to execute any of the described operations of examples 1-24.

Example 56 comprises an apparatus comprising means for executing any of the described operations of examples 34-51.

Example 57 comprises a machine readable medium that stores instructions for execution by a processor to perform any of the described operations of examples 34-51.

Example 58 comprises an apparatus comprising: a memory interface; and processing circuitry configured to: perform any of the described operations of examples 34-51.

Example 59 comprises a Base Station (BS) configured to execute any of the described operations of examples 34-51.

The above description of illustrated aspects of the subject disclosure, including what is described in the Abstract, is not intended to be exhaustive or to limit the disclosed aspects to the precise forms disclosed. While specific aspects and examples are described herein for illustrative purposes, various modifications are possible that are considered within the scope of such aspects and examples, as those skilled in the relevant art can recognize.

In this regard, while the disclosed subject matter has been described in connection with various aspects and corresponding Figures, where applicable, it is to be understood that other similar aspects can be used or modifications and additions can be made to the described aspects for performing the same, similar, alternative, or substitute function of the disclosed subject matter without deviating therefrom. Therefore, the disclosed subject matter should not be limited to any single aspect described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application.

What is claimed is:

1. A baseband processor, comprising:
   a memory interface and a communication interface; and
   processing circuitry communicatively coupled to the memory interface and the communication interface and, when executing instructions received from the memory interface, performs operations comprising:
   generating a Random Access Channel (RACH) preamble in response to a determination to perform a Radio Resource Control (RRC) inactive data transmission in a RRC inactive state;
   providing uplink (UL) data to the communication interface for the RRC inactive data transmission, wherein the RRC inactive data transmission comprises a medium access control control element (MAC CE) with an inactive radio network temporary identifier (I-RNTI), or a truncated I-RNTI (I-RNTI/truncated I-RNTI), or the RRC inactive data transmission is scrambled based on the I-RNTI/truncated I-RNTI;
   starting a contention resolution (CR) timer after the RRC inactive data transmission, wherein the CR timer is set to end at a CR duration limit; and
   receiving, before the CR timer ends at the CR duration limit, a RACH message in response to the RRC inactive data transmission, wherein the RACH message comprises at least one of an uplink (UL) grant or a downlink (DL) assignment scrambled by the I-RNTI/truncated I-RNTI, or the RACH message comprises a DL assignment based on a temporary cell radio network temporary identifier (T-C-RNTI) that is comprised in the MAC CE.

2. The baseband processor of claim 1, wherein the RACH preamble is based on a RACH configuration that is a dedicated RACH configuration for the RRC inactive data transmission.

3. The baseband processor of claim 1, wherein the operations further comprise selecting the RACH preamble from a dedicated preamble group for the RRC inactive data transmission.

4. The baseband processor of claim 1, wherein the RACH preamble is a shared preamble for a RACH configuration of the RRC inactive data transmission and a RACH procedure of a RRC resume procedure.

5. The baseband processor of claim 1, wherein the UL data is less than or equal to a preconfigured uplink data size; and
wherein the determination to perform the RRC inactive data transmission is based on at least one of a predefined radio link quality threshold or a predefined radio link timing threshold.

6. The baseband processor of claim 1, wherein the RRC inactive data transmission is assigned a repetition value, the repetition value determined by the processing circuitry based on a radio link quality or one or more of a L1, L2, or L3 signaling;
wherein a Hybrid Automatic Repeat Request (HARQ) process or a L1 process generates one or more repetitions of the RRC inactive data transmission based at least in part on the repetition value; and
wherein the operations further comprise, after a final repetition of the one or more repetitions, starting one of a random access response (RAR) window associated with the received RACH message or a contention resolution (CR) timer associated with the received RACH message.

7. A User Equipment (UE) device, comprising:
communication circuitry; and
a processor, coupled to the communication circuitry, and configured to cause the UE to:
transmit, via the communication circuitry, a Random Access Channel (RACH) preamble in response to a determination to perform a Radio Resource Control (RRC) inactive data transmission;
transmit, via the communication circuitry, a RRC inactive data transmission, comprising uplink (UL) data, wherein the RRC inactive data transmission comprises a medium access control control element (MAC CE) with an inactive radio network temporary identifier (I-RNTI), or a truncated I-RNTI (I-RNTI/truncated I-RNTI), or the RRC inactive data transmission is scrambled based on the I-RNTI/truncated I-RNTI;
start a contention resolution (CR) timer after generating the RRC inactive data transmission, wherein the CR timer is set to end at a CR duration limit; and
receive, via the communication circuitry, before the CR timer ends at the CR duration limit, a RACH message in response to the RRC inactive data transmission, wherein the RACH message comprises at least one of an uplink (UL) grant or a downlink (DL) assignment scrambled by the I-RNTI/truncated I-RNTI, or the RACH message comprises a DL assignment based on a temporary cell radio network temporary identifier (T-C-RNTI), that is comprised in the MAC CE.

8. The UE device of claim 7, wherein the RRC inactive data transmission is assigned a repetition value, the repetition value determined by the processor based on a radio link quality or one or more of a L1, L2, or L3 signaling;
wherein a Hybrid Automatic Repeat Request (HARQ) process or a L1 process transmits one or more repetitions of the RRC inactive data transmission based at least in part on the repetition value; and
after a final repetition of the one or more repetitions, the processor is further configured to start one of a RAR window associated with the received RACH message or a contention resolution (CR) timer associated with the received RACH message.

9. The UE device of claim 7, wherein the RACH preamble is based on a RACH configuration that is a dedicated RACH configuration for the RRC inactive data transmission.

10. The UE device of claim 7, further comprising selecting the RACH preamble from a dedicated preamble group for the RRC inactive data transmission.

11. The UE device of claim 7, wherein the RACH preamble is a shared preamble for a RACH configuration of the RRC inactive data transmission and a RACH procedure of a RRC resume procedure.

12. The UE device of claim 7, wherein the UL data is less than or equal to a preconfigured uplink data size; and
wherein the determination to perform the RRC inactive data transmission is based on at least one of a predefined radio link quality threshold or a predefined radio link timing threshold.

13. A method for a user equipment (UE), the method comprising:
transmitting a Random Access Channel (RACH) preamble associated with a Radio Resource Control (RRC) inactive data transmission;
transmitting a RRC inactive data transmission, wherein the RRC inactive data transmission is a Physical Uplink Shared Channel (PUSCH) message comprising uplink (UL) data, wherein the RRC inactive data transmission comprises a medium access control control element (MAC CE) with an inactive radio network temporary identifier (I-RNTI), or a truncated I-RNTI (I-RNTI/truncated I-RNTI), or the RRC inactive data transmission is scrambled based on the I-RNTI/truncated I-RNTI;
starting a contention resolution (CR) timer upon transmitting the RRC inactive data transmission, wherein the CR timer is set to end at a CR duration limit; and
receiving, before the CR timer ends at the CR duration limit, a RACH message in response to the RRC inactive data transmission, wherein the RACH message comprises at least one of an uplink (UL) grant or a downlink (DL) assignment scrambled by the I-RNTI/truncated I-RNTI, or the RACH message comprises a DL assignment based on a temporary cell radio network temporary identifier (T-C-RNTI) that is comprised in the MAC CE.

14. The method of claim 13, further comprising selecting the preamble from a dedicated preamble group for the RRC inactive data transmission.

15. The method of claim 13, wherein the RACH preamble is based on a RACH configuration that is a dedicated RACH configuration for the RRC inactive data transmission.

16. The method of claim 13, wherein the RACH preamble is a shared preamble for a RACH configuration of the RRC inactive data transmission and a RACH procedure of a RRC resume procedure.

17. The method of claim 13, wherein the UL data is less than or equal to a preconfigured uplink data size.

18. The method of claim 17, wherein the RRC inactive data transmission is performed based on at least one of a predefined radio link quality threshold or a predefined radio link timing threshold.

19. The method of claim 13, wherein the RRC inactive data transmission is assigned a repetition value, the repetition value determined based on a radio link quality or one or more of a L1, L2, or L3 signaling;
   wherein a Hybrid Automatic Repeat Request (HARQ) process or a L1 process generates one or more repetitions of the RRC inactive data transmission based at least in part on the repetition value.

20. The method of claim 19, further comprising, after a final repetition of the one or more repetitions, starting one of a random access response (RAR) window associated with the received RACH message or a contention resolution (CR) timer associated with the received RACH message.

* * * * *